United States Patent
Mladin et al.

(10) Patent No.: US 11,503,446 B2
(45) Date of Patent: *Nov. 15, 2022

(54) SERVICE CAPABILITY EXPOSURE AT THE USER EQUIPMENT

(71) Applicant: InterDigital Patent Holdings, Inc., Wilmington, DE (US)

(72) Inventors: Catalina Mihaela Mladin, Hatboro, PA (US); Michael F. Starsinic, Newtown, PA (US); Hongkun Li, Malvern, PA (US); Rocco Di Girolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,902

(22) Filed: Jan. 15, 2021

(65) Prior Publication Data

US 2021/0136548 A1    May 6, 2021

Related U.S. Application Data

(63) Continuation of application No. 16/494,907, filed as application No. PCT/US2018/023257 on Mar. 20, 2018, now Pat. No. 10,932,111.

(Continued)

(51) Int. Cl.
*H04W 4/50* (2018.01)
*H04W 4/70* (2018.01)
(Continued)

(52) U.S. Cl.
CPC ............ *H04W 4/70* (2018.02); *H04W 4/50* (2018.02); *H04W 12/08* (2013.01); *H04W 12/35* (2021.01)

(58) Field of Classification Search
CPC ......... H04W 4/70; H04W 4/50; H04W 12/35; H04W 12/08
See application file for complete search history.

(56) References Cited

U.S. PATENT DOCUMENTS 10,932,111 B2 * 2/2021 Mladin .................. H04W 4/50
2006/0174018 A1   8/2006 Zhu et al.
(Continued)

FOREIGN PATENT DOCUMENTS

CN    1543748 A    11/2004
CN   101009631 A    8/2007
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (EUTRAN) access (Release 14)",3GPP TS 23.401, V14.3.0, May 2017.

(Continued)

*Primary Examiner* — Barry W Taylor
(74) *Attorney, Agent, or Firm* — BakerHostetler

(57) ABSTRACT

The present application is directed to an apparatus communicating with a mobile core network. The apparatus includes a non-transitory memory including instructions stored thereon for configuring a service. The apparatus also includes a processor operably coupled to the non-transitory memory configured to execute the instructions of: (i) receiving, from a core network node, first information for accessing a Network Exposure Function (NEF); (ii) receiving a request for the service from an application on user equipment (UE); (iii) creating a request for the service; (iv) using the first information to send the created request to the NEF; (v) receiving a response from the NEF, the response includes a second information; and (vi) sending the second informa- (Continued)

tion to the application. The service includes one or more of buffering, background data transfer, communication pattern configuration, sponsored services, reachability, mobile originating/paging-off mode, and value added services. Moreover, the received request includes parameters to configure the service. Further, the second information includes parameters selected from desired time window, desired data transfer size, desire quality of service, indication whether flow is sponsored, maximum cost basis, qualitative measurements and combinations thereof.

17 Claims, 20 Drawing Sheets

Related U.S. Application Data

(60) Provisional application No. 62/473,658, filed on Mar. 20, 2017.

(51) Int. Cl.
*H04W 12/08* (2021.01)
*H04W 12/30* (2021.01)

(56) References Cited

U.S. PATENT DOCUMENTS

| | | | |
|---|---|---|---|
| 2015/0341889 A1 | 11/2015 | Starsinic et al. | |
| 2016/0360336 A1 | 12/2016 | Gross et al. | |
| 2017/0034749 A1 | 2/2017 | Chandramouli et al. | |
| 2017/0318452 A1 | 11/2017 | Hahn et al. | |
| 2018/0227872 A1 | 8/2018 | Li et al. | |
| 2019/0007329 A1* | 1/2019 | Velev | H04W 4/70 |
| 2019/0342940 A1* | 11/2019 | Ryu | H04W 4/90 |
| 2020/0022027 A1 | 1/2020 | Iwai et al. | |
| 2020/0029249 A1 | 1/2020 | Livanos et al. | |
| 2020/0053531 A1* | 2/2020 | Myhre | H04W 60/04 |

FOREIGN PATENT DOCUMENTS

| | | |
|---|---|---|
| CN | 101552944 A | 10/2009 |
| CN | 101667926 A | 3/2010 |
| CN | 102164101 A | 8/2011 |
| CN | 102196012 A | 9/2011 |
| CN | 102843349 A | 12/2012 |
| CN | 104904243 A | 9/2015 |
| CN | 105516979 A | 4/2016 |
| EP | 1098490 A2 | 5/2001 |
| WO | 2016/085001 A1 | 6/2016 |

OTHER PUBLICATIONS

3GPP TR 23.708 V13.0.0, "Technical specification Group Services and System Aspects; Architecture Enhancements for Service Capability Exposure (Release 13)", Jun. 2015, 31 pages.
3GPP TS22.011 V14.3.0, "Technical Specification Group Services and System Aspects; Service Accessibility (Release 14)", Jun. 2016, 30 pages.
GSM Association Official Document TS.34, "IoT Device Connection Efficiency Guidelines, Version 3.0", Mar. 30, 2016, 75 pages.
"3rd Generation Partnership Project; Technical Specification Group Services and System Aspects; Architecture enhancements for service capability exposure(Release 13)", 3GPP TR 23.708 V13.0.0, 3GPP, 2015, 6, 21.
3GPP TR 23.799 V1.2.1, "Technical Specification Group Services and System Aspects; Study on Architecture for Next Generation System (Release 14)", Dec. 2016.
Huawei et al., "Way Forward for SCEF Northbound API work", 3GPP Draft; S2-170194 DP on SCEF API V0.3, 3rd Generation Partnership Project (3GPP), Mobile Competence Centre ; 650, Route Des Lucioles ; F-06921 Sophia-Antipolis Cedex ; FRANCE, vol. SA WG2, No. Spokane, WA, USA; Jan. 16, 2017, 5 pages.

* cited by examiner

FIG. 3B(iii)

FIG. 3B(ii)

SERVICE CAPABILITY EXPOSURE AT THE USER EQUIPMENT

CROSS REFERENCE TO RELATED APPLICATIONS

This application is a continuation application of U.S. patent application Ser. No. 16/494,907 filed Sep. 17, 2019 which is the National Stage Application of International Patent Application no. PCT/US2018/023257 filed Mar. 20, 2018, which claims the benefit of priority of U.S. Provisional Application No. 62/473,658 filed Mar. 20, 2017, entitled "Service Capability Exposure at the User Equipment," the contents of which is are hereby incorporated by reference in their entireties.

FIELD

The present application is directed to apparatuses and methods for directly exposing services to user equipment.

BACKGROUND

User equipment (UE) currently does not have a way of accessing services that the mobile core network (MCN) exposes to third party servers and other network functions. Likewise, applications hosted on UE are also unable to access and configure the capabilities exposed by the MCN. As a result, the number of deployment scenarios where some services can be leveraged is severely reduced.

Services that are typically leveraged by third party servers include communication patterns, buffering at a network node, and background data transfer (BDT). When the UE is running a single application, it must communicate its buffering needs for the particular service with the remote application server. In turn, the application server configures the in-network buffering service. This assumes the application server has a business relationship with the mobile network operator (MNO). The buffering process is inefficient for the UE and application.

Separately when more than one application on the UE is requesting the service, and each application is communicating with different remote application servers, a significant delay is realized. This is because core network user plane buffering can only be provided on a per-UE basis without deep-packet inspection. Hence, remote application servers or the mobile core network must coordinate the buffering configuration across all applications such that UE has a single buffering configuration.

Currently, remote application servers and the mobile core network coordinate their background data transfer requests. This is done to maximize a UE's time in deep sleep. So, if a UE wants to determine what the network considers off-peak hours to upload or download information, it must ask a remote application server to negotiate a BDT time and charging rate with the MCN assuming a relationship exits. However, this is difficult to achieve because the services provided by the remote servers are generally independent of each other.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and system for exposing a service to user equipment.

In one aspect of the application, there is an apparatus communicating with a mobile core network including a non-transitory memory including instructions stored thereon for configuring a service. The apparatus also includes a processor operably coupled to the non-transitory memory configured to execute the instructions of: (i) receiving, from a core network node, first information for accessing a Network Exposure Function (NEF); (ii) receiving a request for the service from an application on user equipment (UE); (iii) creating a request for the service; (iv) using the first information to send the created request to the NEF; (v) receiving a response from the NEF, the response includes a second information; and (vi) sending the second information to the application. The service includes one or more of buffering, background data transfer, communication pattern configuration, sponsored services, reachability, mobile originating/paging-off mode, and value added services. Moreover, the received request includes parameters to configure the service. Further, the second information includes parameters selected from desired time window, desired data transfer size, desire quality of service, indication whether flow is sponsored, maximum cost basis, qualitative measurements and combinations thereof.

Another aspect of the application is directed to a method for communicating with a mobile core network. The method includes a step of receiving, from a core network node, first information for accessing a Network Exposure Function (NEF). The method also includes a step of receiving a request for the service from an application on user equipment. The method also includes a step of creating a request for the service. The method further includes a step of using the first information to send the created request to the NEF. The method even further includes a step of receiving a response from the NEF, the response includes a second information. The method still even further includes a step of sending the second information to the application. The service includes one or more of buffering, background data transfer, communication pattern configuration, sponsored services, reachability, mobile originating/paging-off mode, and value added services. Moreover, the received request includes parameters to configure the service. In addition, the second information includes parameters selected from desired time window, desired data transfer size, desire quality of service, indication whether flow is sponsored, maximum cost basis, qualitative measurements and combinations thereof.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
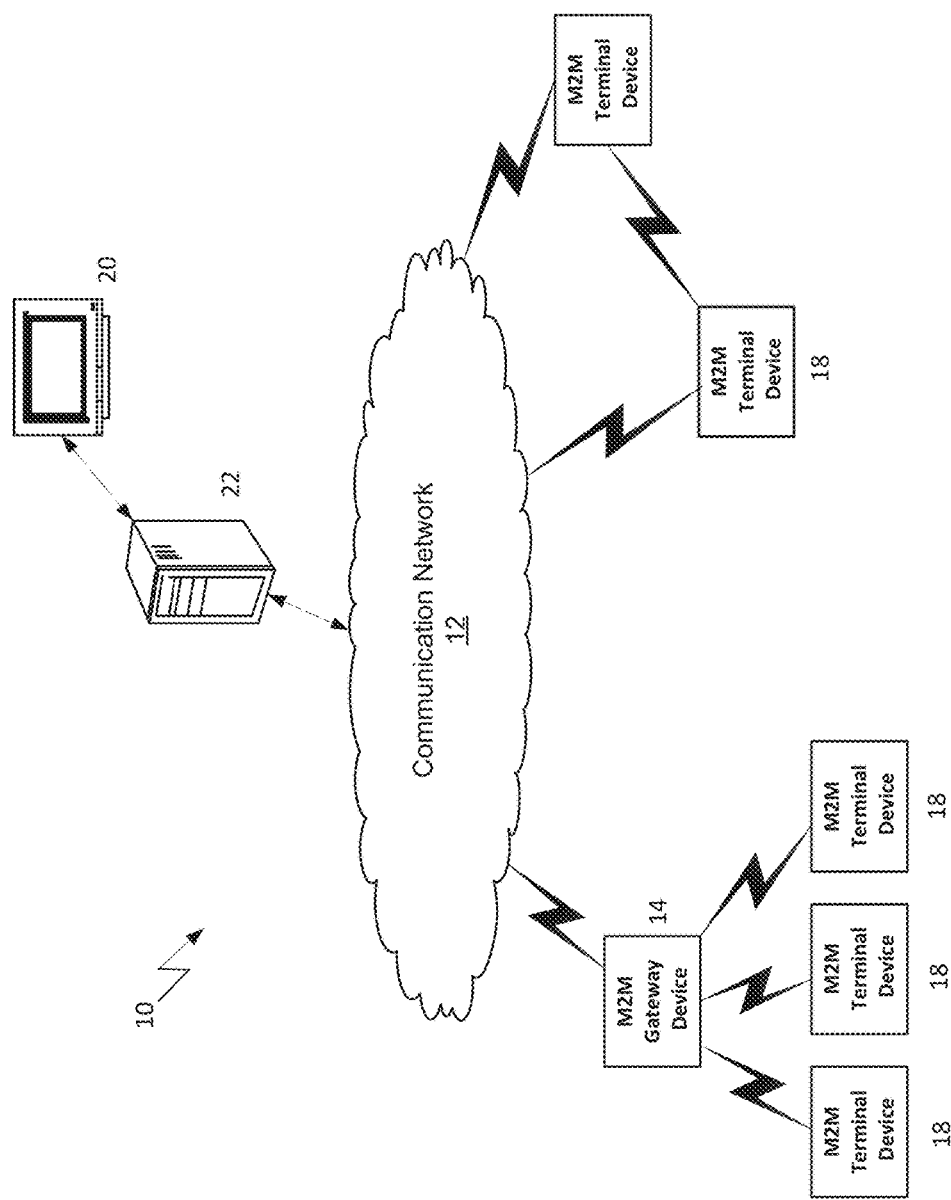
FIG. 1A illustrates a system diagram of an exemplary machine-to-machine (M2M), Internet of Things (IoT), or Web of Things (WoT) communication system in which one or more disclosed embodiments may be implemented.

A detailed description of the illustrative embodiments will be discussed in reference to various figures, embodiments and aspects herein. Although this description provides detailed examples of possible implementations, it should be understood the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The 4G MCN exposes capabilities of network third party application servers. These capabilities are exposed via the service capability exposure function (SCEF). The 5G MCN also exposes capabilities of the network third party application servers. In the 5G core network, exposure is achieved via the network exposure function (NEF). One objective of this application is to describe how a UE can access and use the capabilities of the MCN.

New 5G control plane (CP) procedures are proposed to allow the UE to access the NEF and configure core network services and capabilities. The procedures describe how the request may be authorized by the mobile core network and how the NEF can configure the network to provide the requested services and capabilities.

New 5G user plane procedures are proposed to allow the UE to access the NEF and configure core network services and capabilities via IP based messaging. The procedure describes how the request may be authorized by the NEF and how the NEF can configure the network to provide the requested services and capabilities. Examples of services that UE is able to use the proposed procedures to access are buffer configuration, BDT, sponsored services, enhanced reachability, paging off mode, and value added services.

Another aspect of this application describes methods for UE hosted applications to access services or capabilities that are exposed via the UE modem. Access to these functions should include a permission request which may be provided via a GUI window asking if the user would like to request permission. A permission request may cause the OS or modem to initiate a procedure to determine if the user has permission to use the API.

For accessing services/capabilities exposed to the UE Applications via the UE Modem, the disclosure proposes Connection Status APIs, Connectivity Configuration APIs and Platform Status APIs. These methods enable access to features such as: monitoring data rates, managing back off, managing EAB, managing suspend resume, managing deep sleep, connection configuration APIs, indication of low access priority support managing connection preference configuration, and managing event reporting Definitions and Acronyms Provided below are definitions for terms and phrases commonly used in this application in Table 1. In particular, a modem is defined as the part of the UE that enables wireless communications, e.g., "communications module" in GSMA TS 34. For example, for a 3GPP UE, the modem is the part that needs to confirm to 3GPP specifications to enable communications with the base station. In addition to the modem, the UE may host one or more applications, as well as middleware e.g., OS, service layer, etc.

TABLE 1

| ACRONYM | PHRASE |
| --- | --- |
| 3GPP | 3$^{rd}$ Generation Partnership Program |
| 5G GUTI | 5G Globally Unique Temporary Identifier |
| AMF | Access and Mobility (Management) Function |
| API | Application Program Interface |
| APN | Access Point Name |

TABLE 1-continued

| ACRONYM | PHRASE |
| --- | --- |
| AS | Application Server |
| BDT | Background Data Transfer |
| CN | Core Network |
| CP | Control Plane |
| DN | Data Network |
| EPC | Evolved Packet Core |
| ETWS | Earthquake and Tsunami Warning System |
| GSM | Global System for Mobile communication |
| GSMA | GSM Association |
| IP | Internet Protocol |
| LTE | Long Term Evolution |
| MNO | Mobile Network Operator |
| MM | Mobility Management |
| MO | Mobile Originating (call) |
| MT | Mobile Terminating (call) |
| NAS | Non Access Stratum |
| NEF | Network Exposure Function |
| NF | Network Function (generic) |
| PDN | Packet Data Network |
| PLMN | Public Land Mobile Network |
| P-GW | PDN Gateway |
| QoS | Quality of Service |
| RAN | Radio Access Network |
| SCS | Service Capability Server |
| SCEF | Service Capability Exposure Framework |
| SM | Session Management |
| SMF | Session Management Function |
| SPUI | Subscriber Permanent Identity |
| UE | User Equipment |
| UP | User Plane |
| UPF | User Plane Function |

General Architecture

FIG. 1A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 2-5 may comprise a node of a communication system, such as the ones illustrated in FIGS. 6-20.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 1A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 1B:
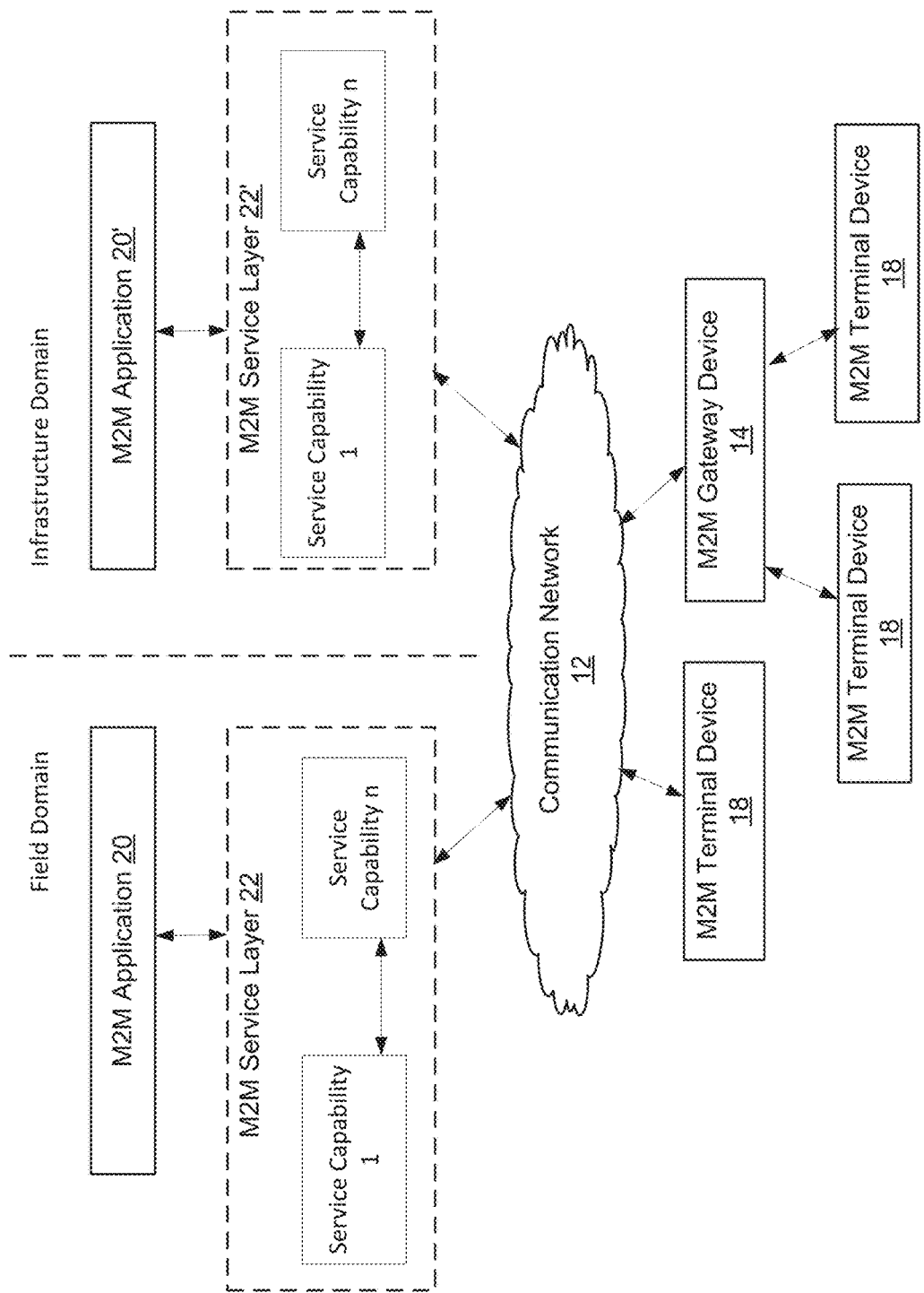
FIG. 1B illustrates a system diagram of an exemplary architecture that may be used within the M2M/IoT/WoT communications system illustrated in FIG. 1A.

Referring to FIG. 1B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 1B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 1B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, is implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 1C or 1D described below.

Further, the methods and functionalities described herein may be implemented as part of an M2M network that uses a Service Oriented Architecture (SOA) and/or a Resource-Oriented Architecture (ROA) to access services.

Figure 1C:
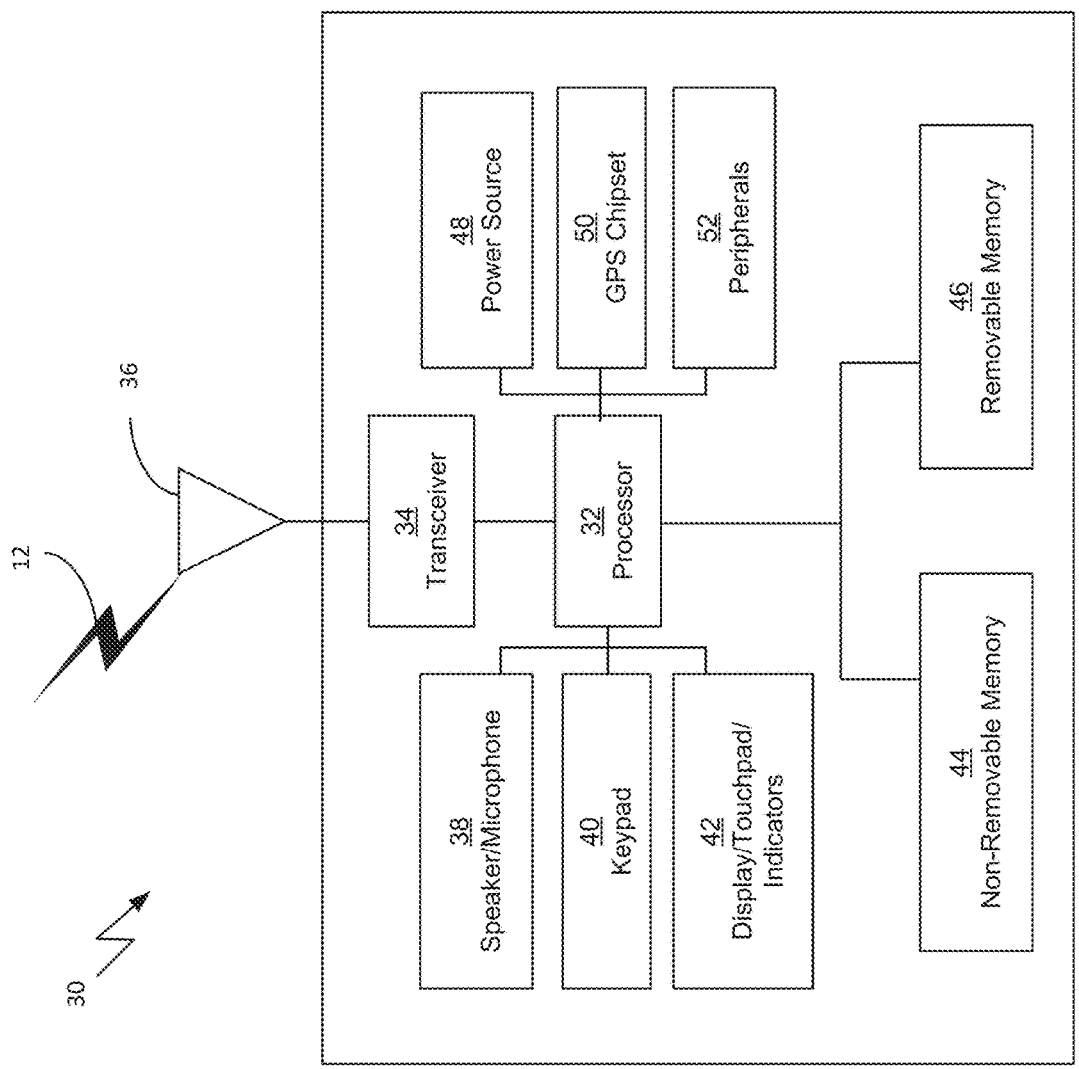
FIG. 1C illustrates a system diagram of an exemplary communication network node, such as an M2M/IoT/WoT device, gateway, or server that may be used within the communications system illustrated in FIGS. 1A and 1B.
Figure 1D:
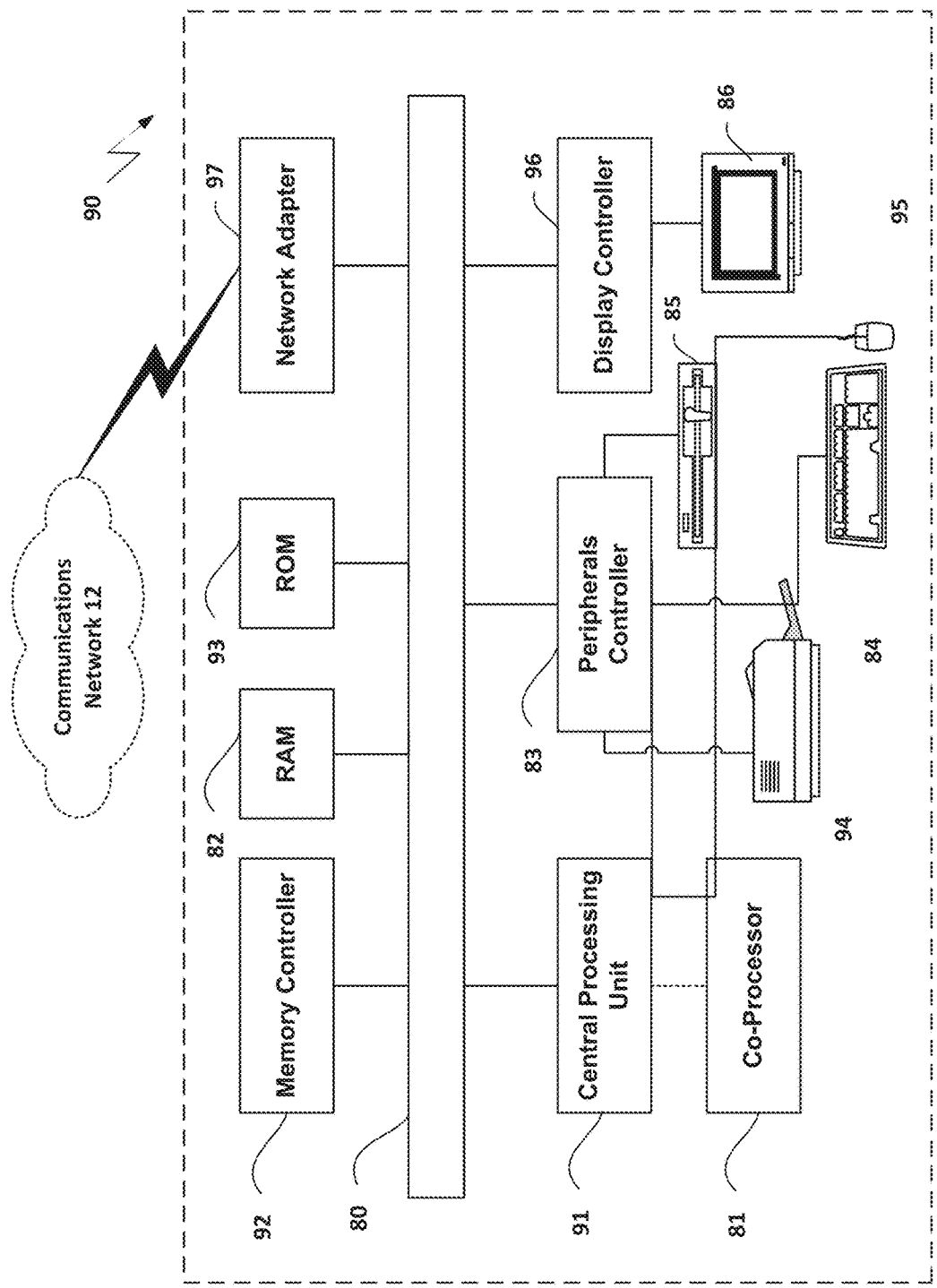
FIG. 1D illustrates a block diagram of an exemplary computing system in which a node of the communication system of FIGS. 1A and 1B may be embodied.

FIG. 1C is a block diagram of an example hardware/software architecture of a node of a network, such as one of the clients, servers, or proxies illustrated in FIGS. 2-5 which may operate as an M2M server, gateway, device, or other node in an M2M network such as that illustrated in FIGS. 6-20. As shown in FIG. 1C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements techniques to provide service capability exposure to applications on user equipment to network exposure functions, e.g., in relation to the methods described in reference to FIGS. 6-20 and the accompanying Tables, or in a claim The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 1C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the techniques of providing service capability exposure to applications on user equipment herein, e.g., in relation to FIGS. 6-20, or in a claim. While FIG. 1C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 3A:
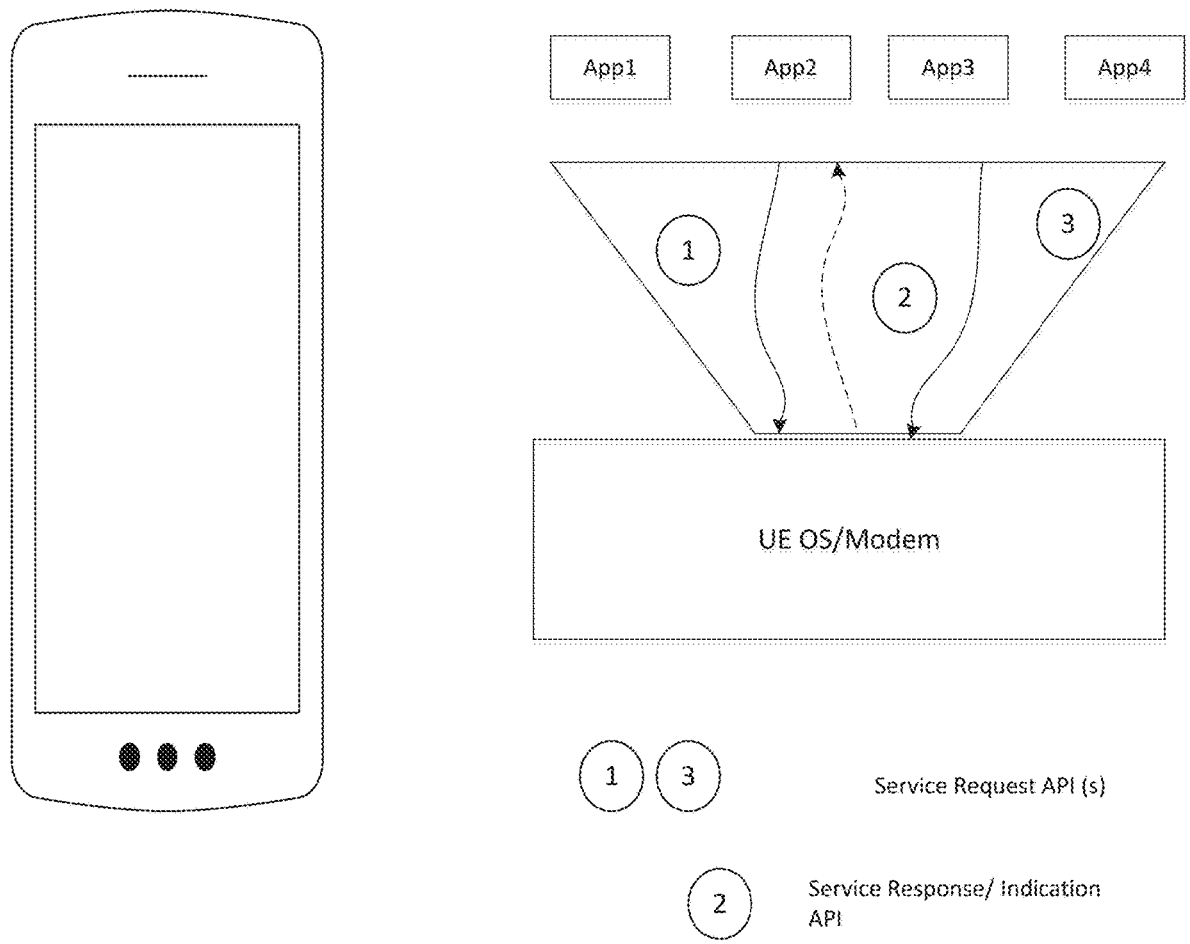
FIG. 3A illustrates user equipment including applications, OS/Modem and APIs.
Figure 3B:
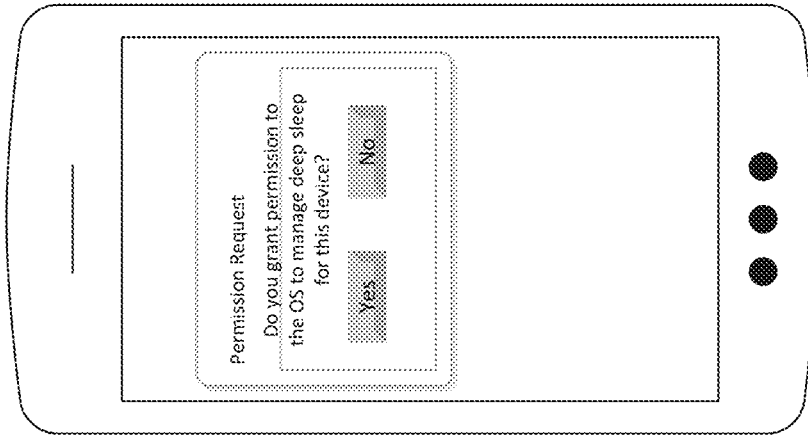
FIG. 3B(i)-(iii) illustrate graphical user interfaces on a display of user equipment.
Figure 3B:
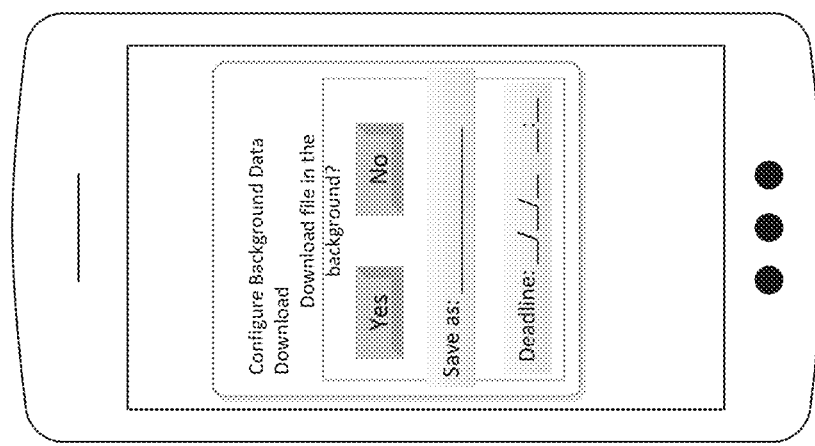
Figure 3B:
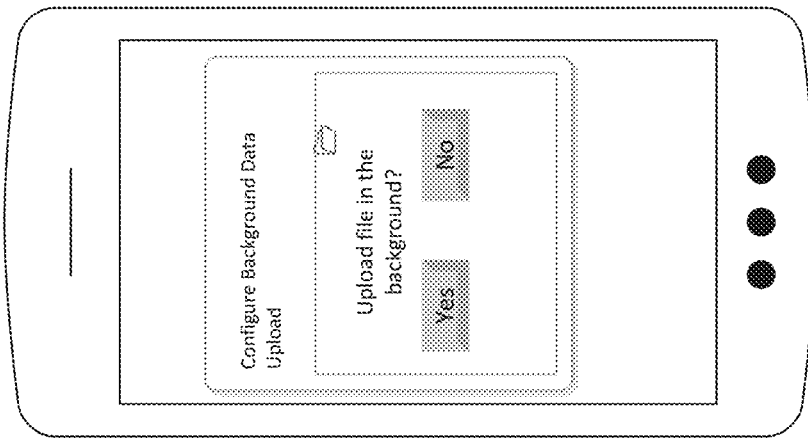
Figure 4:
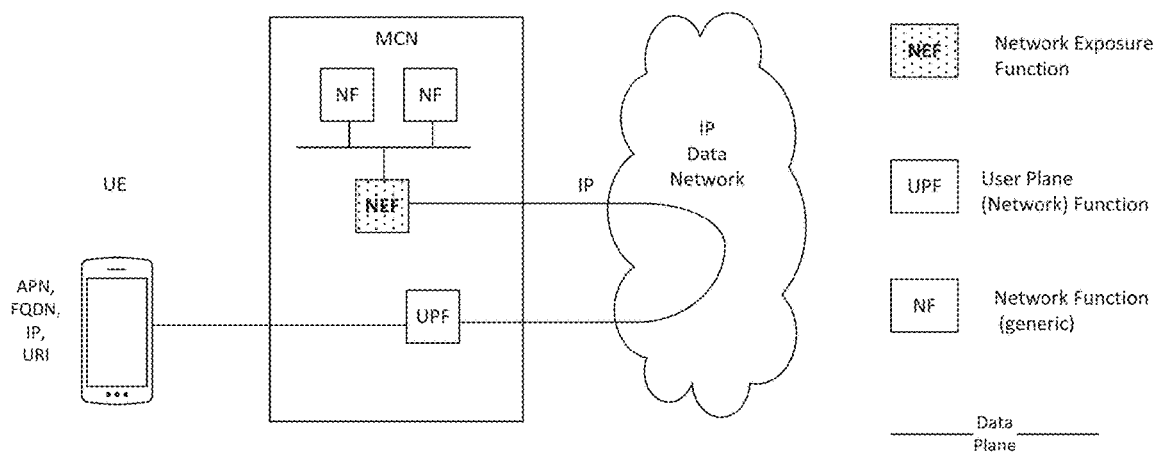
FIG. 4 illustrates network exposure via the data plane according to an aspect of the application.

FIG. 4 is a block diagram of an exemplary computing system 90 which may also be used to implement one or more nodes of a network, such as the clients, servers, or proxies illustrated in FIGS. 2-5, which may operate as an M2M server, gateway, device, or other node in an M2M network such as that illustrated in FIGS. 6-20.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 1A-D, to enable the computing system 90 to communicate with other nodes of the network.

Service Capability Exposure in 3GPP

Release 13 of 3GPP defines the Service Capability Exposure Framework as a means to expose the services and capabilities provided by 3GPP network interfaces. Several issues were defined as part of this effort, including, and not limited to: (i) support for setting up an AS session with required QoS; (ii) support of changing the chargeable party at the session set-up or during the session; (iii) support of 3rd party interaction on information for predictable communication patterns; (iv) support for informing a 3rd party about potential network issues; and (v) support for 3GPP resource management for background data transfer.

Figure 2A:
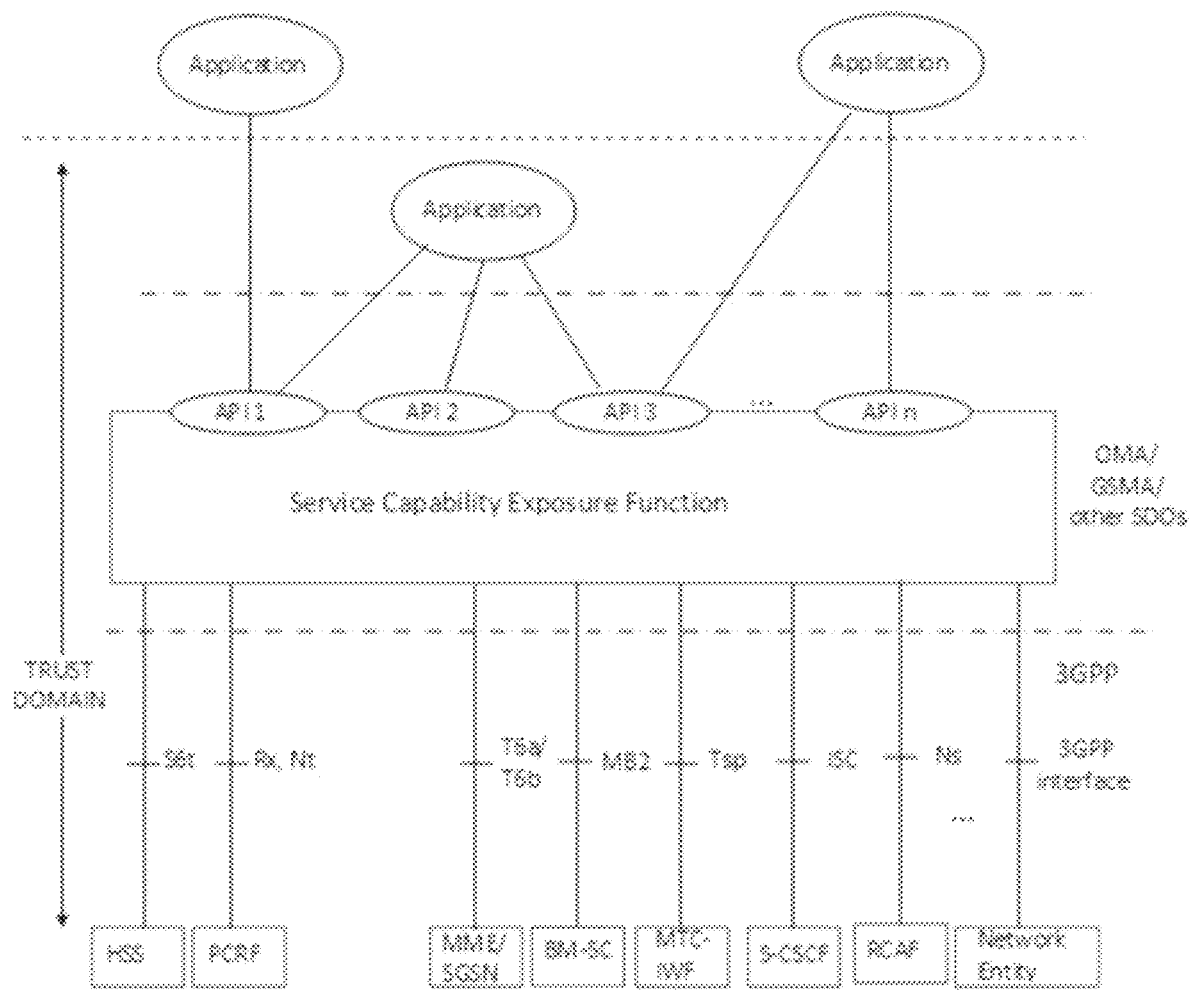
FIG. 2A illustrates 3GPP architecture for service capability exposure.

TS 23.682 3GPP introduced a functional block, the Service Capabilities Exposure Function (SCEF) to provide "a means to securely expose the services and capabilities provided by 3GPP network interfaces." The architectural reference model is illustrated in FIG. 2. The exposure of services by the network creates a "toolbox" of capabilities that, with proper authorization, may be used by third Party Servers (SCS/AS) to retrieve information, to request specific services, to receive notifications, to request the setting of specific parameters, etc. The SCEF also provides means for the discovery of the exposed service capabilities. This access to network capabilities is provided in Release 13 through homogenous network application programming interfaces, e.g., Network API 430, defined by OMA, GSMA, and possibly other standardization bodies. The SCEF abstracts the services from the underlying 3GPP network interfaces and protocols.

The SCEF internal architecture and APIs to expose these 3GPP service capabilities via SCEF are not in the scope of 3GPP. However, 3GPP defined some expected behavior for the SCEF and invited other bodies such as oneM2M to consider the creation of a useful set of APIs to take advantage of these new capabilities for operators to monetize their networks. Release 13 Service Capability Exposure in 3GPP does not address exposure of these services to the UEs, but only to the Service Capability and Application Servers.

3GPP Features for Potential MTC Related Overload

The following features are among those that have been defined by 3GPP (TS 23.401 and TS 22.011) to prevent network overload.

Devices can be commanded to use a long minimum periodic PLMN search time. The increased search time decreases the rate at which MTC devices will attempt to connect to a competing network after network failure.

Following the failure of a more preferred PLMN, UEs configured as above might change to other local competing networks. Expiry of this search timer will lead to the UE re-attempting to access the failed network, and then, if that network has not yet recovered, re-accessing one of the local competing networks. Use of a too short timer for the more preferred PLMN search can both prevent the failed network from recovering, and, impose more load on the local competing networks.

UE Configuration for Access Barring and Back-Off

When the UE sets up a PDN connection, PDP context, or performs an MM or SM procedure, it can indicate to the network that it is Low Access Priority. The UE may also be configured with permission for overriding Low Access Priority (only applicable for UEs also configured for Low Access Priority). Similarly UE may be configured with permission for overriding EAB (extended access barring) (only applicable for UEs configured for EAB). In Release 10 the UE has to be configured with both at the same time.

UEs may be configured for Low Access Priority and Extended Access Barring. This configuration is primarily for usage by applications or users that can tolerate being deferred when competing with other UEs for accessing network resources, e.g. during congestion situations. A subscriber can by agreement with its operator be required to use UEs that are configured for Low Access Priority. The agreement may include a specific tariffing. CDRs show whether a PDN connections was activated for use with Low Access Priority.

UEs configured for Low Access Priority and Extended Access Barring may be also configured with permission for an override of low access and Extended Access Barring priority restrictions. This configuration is primarily for usage by applications or users that most of the time can tolerate being deferred due to Low Access Priority when competing with other UEs for accessing network resources, but occasionally the application or user needs access to the network also when the Low Access Priority configuration would prevent getting access. For getting network access also during low priority access or Extended Access Barring restriction conditions, the user or application (upper layers in UE) may request the UE to initiate the activation of a PDN connection without Low Access Priority.

The permission for overriding Low Access Priority and Extended Access Barring restrictions by the application or user should be handled with care because as long as such a PDN connection without Low Access Priority is active, the UE is not affected by any access restriction conditions that the network may set for access with Low Access Priority. That is, after the activation of a PDN connection without Low Access Priority, all further MM and RRC access requests of the UE are performed without Low Access Priority as long as such a PDN connection is active.

A subscriber can, by agreement with its operator, be required to use UEs that are configured with permission for overriding Low Access Priority and Extended Access Barring. As the 3GPP system cannot determine whether any overriding of access restrictions by such UEs is justified, the agreement can include a specific tariffing to avoid excessive usage of overriding the Low Access Priority. This can for example be a specific tariffing for the amount of activations and/or the duration of PDN connections that are not with Low Access Priority. Charging records show whether the UE activated the PDN connection with or without Low Access Priority, but not necessarily the access priority the UE uses for the individual data transfer requests.

For each of the Access Classes 0-9, the E-UTRAN network broadcasts information which applies to all UEs in each class. The UE determines the barring status with the information provided from the serving network, and performs the access attempt accordingly. If the access attempt is not allowed, further access attempts of the same type are then barred for a time period that is calculated based on the 'mean duration of access control' provided by the network and the random number drawn by the UE.

If it is Low Access Priority, the network can reject the message with a backoff time. When a UE is accessing the network with Low Access Priority, then the UE may be subject for longer backoff.

When a UE is accessing the network with Low Access Priority, then the UE may be subject for longer backoff timers at overload and consequently need to be designed to be tolerant to delays when accessing the network.

APN Based Congestion Control

APN Rate Control is intended to allow operators to offer customer services such as "maximum of Y messages per day". Existing Aggregated Maximum Bit Rate (AMBR) mechanisms are not suitable for such a service since, for radio efficiency and UE battery life reasons, an AMBR of e.g., >100 kbit/s is desirable and such an AMBR translates to a potentially large daily data volume.

The PDN GW or SCEF can send an APN Uplink Rate Control command to the UE using the PCO information element.

The APN Uplink Rate Control applies to data PDUs sent on that APN by either Data Radio Bearers (S1-U) or Signaling Radio Bearers (NAS Data PDUs).

The rate control information is separate for uplink and downlink. The rate control information is in the form of a positive integer number of packets per time unit, and includes an indication as to whether or not exception reports can still be sent if this rate control limit has been met.

The UE shall comply with this uplink rate control instruction. The UE shall consider this rate control instruction as valid until it receives a new one from either PDN GW or from SCEF. The PDN GW or SCEF may enforce the Uplink Rate Control by discarding or delaying packets that exceed the rate that is indicated to the UE. If used, it is assumed that the APN Rate Control is set such that the APN Rate Control rate limits the communication before any used Serving PLMN Rate Control, also taking into account the number of simultaneous PDN connections allowed by the subscription.

"Paging Off" (i.e., "MO-Only") Mode

It has been proposed that MTC UEs can support a "Paging Off" mode, also known as Mobile Originated (MO)-only, which allows for Mobility Management signaling optimizations in the network. In this mode, the MTC UE does not send periodic TAU and is no longer reachable via paging, so the network is able to turn off the paging signaling to the UE. Registration is performed by the UE upon the expiration of a (potentially very long) registration timer, whose value is provided by the network. The UE might still be available for MT data transfer for a period of time following a MO procedure, which enables reverting to the normal idle mode behavior.

The applicability of the "Paging Off" mode might be based on UE subscription data and network policies, or any combination of them. The network determines whether this mode should be applied and indicates it to the UE during registration signaling. The UE and core network re-initiates (or exits) the MO only mode at subsequent registration signaling.

GSMA Guidelines

GSMA has issued a number of functional guidelines (GSMA TS-34) for IoT, calling to ensure IoT device connection efficiency. These guidelines point towards use cases and requirements for functionality to be enabled in this paper.

GSMA TS-34 guidelines require that IoT Device Application should always be prepared to handle situations when communication requests fail. For example "depending upon the IoT Service, no communication request by the IoT Device Application should ever be retried indefinitely—the request should eventually timeout and be abandoned."

Communication retry mechanisms may include simple counting of failed attempts since the data connection was first established or monitoring the number of failed attempts within a certain period of time. For example, if the data connection is lost more than five times within an hour, then the request can be suspended.

This can be a more reliable technique to avoid short but regular connection problems, such as when a device is moving away from one network cell to another. The data connection can be lost when the device switches between cells, but when the cell is providing good coverage; the request can be processed successfully.

Similarly a device may monitor the number of network connections it attempts or the volume of data it sent/received over a set period of time. Traffic may be suspended if either of these metrics exceeds a maximum value, and reports should be sent to the IoT Service Platform.

GSMA also provides guidance that a modem should support the following diagnostic features for Remote Diagnostic. For CN, use of the following reports have been recommended: (i) Status of peripheral devices attached to communication module; (ii) Report re-boot history (stored in non-volatile memory); (iii) Report stored history of local servicing of the communication module; and (iv) Report the total amount of memory currently being used and the amount of free memory. Some reports have been recommended to be sent by the IoT Device Application to the IoT service platform. For example, when there is an unexpected power outage or unexpected battery power problem a notification should provide relevant information.

Service Capability Exposure at the UE

Figure 2B:
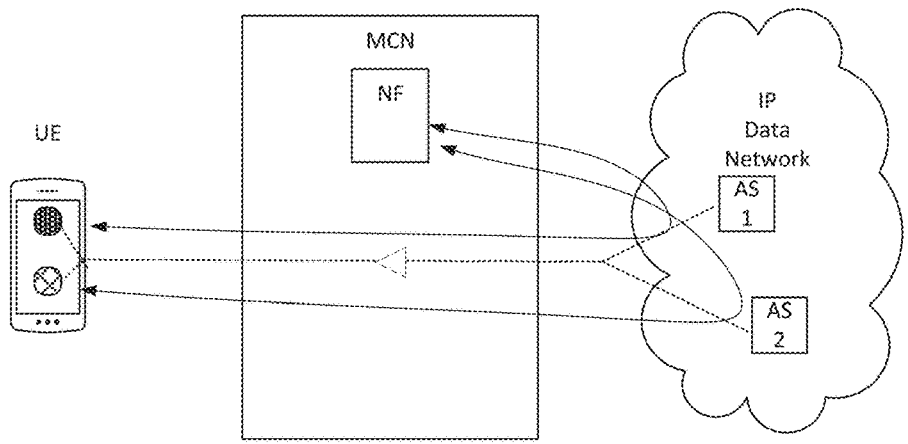
FIG. 2B illustrates a use case for configuring in-network buffering.

According to an embodiment, a use case configuring In-Network Services is described as shown in FIG. 2B. Specifically, applications want to configure a buffering service in the network slice to limit the number of packets that can be held in the buffer when the UE is in a deep sleep state.

The buffer should be sized large enough so that the UE does not miss important messaging, however, it should not be sized so large that the UE is deluged with traffic upon wake up.

Consider a UE that is running a single application in one exemplary embodiment. If the application can benefit from using a buffering service in the network, it must communicate its buffering needs with the remote application server and request that the application server configure the in network buffering service (assuming that the application server has a business relationship with the Mobile Network Operator (MNO)).

Consider another case where there is more than one Application on the UE requesting this feature and each application is communicating with different remote application servers. Within the Core Network User Plane buffering i can only be provided on a per-UE basis without deep-packet inspection. Providing for this case requires therefore that the remote application servers or mobile core network somehow coordinate the buffering configuration across all applications so that the UE has a single buffering configuration. By exposing a service, such as buffering, to the UE, the service can be coordinated and controlled directly by the UE; coordination between 3rd party applications would not be required.

Figure 2C:
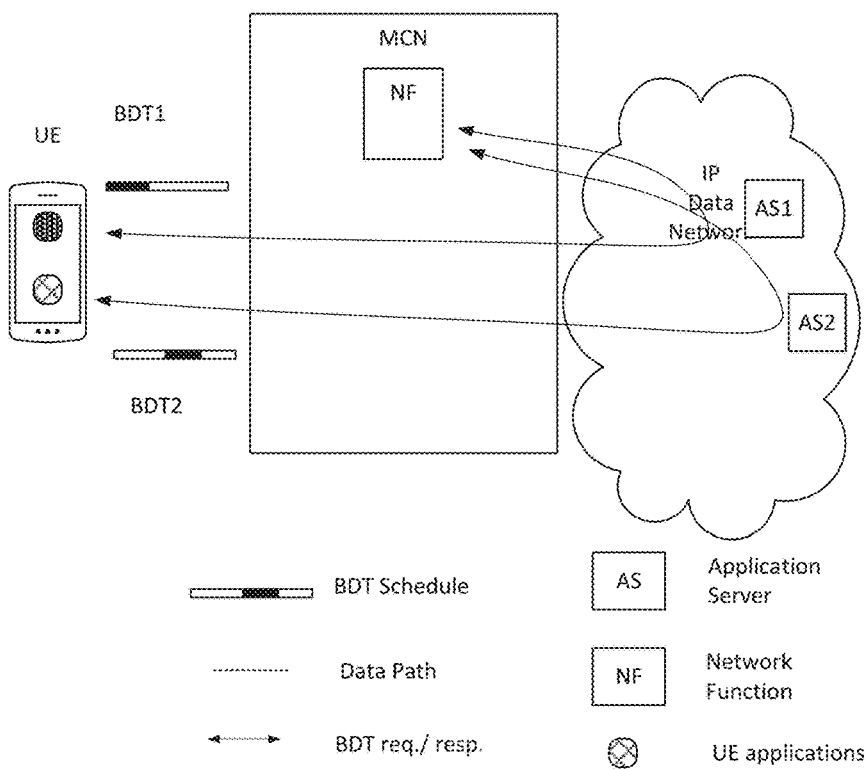
FIG. 2C illustrates a use case for configuring background data transfer.

According to another embodiment, a use case for background data transfer is described as shown in FIG. 2C. Consider a smart meter that wants to download a large software upgrade. It would be most efficient if the smart meter downloaded the new software image during off-peak hours. In order for the UE determine what the network considers to be off peak hours, it must ask a remote application server to negotiate a background data transfer time and charging rate with the Mobile Core Network (this assumes that the remote Application Server has a relationship with the Mobile Core Network operator. The same approach would apply if the UE desired to upload a large amount of data.

Another problem arises when there are multiple applications on the UE that would like to perform a background data transfer. Without coordination between the remote application servers the BDT transfer scheduling might result in an expanded wake up time. These transfers should be coordinated so that they are performed at approximately the same time and the UE could stay in deep sleep for longer stretches of time.

Currently the remote applications servers and mobile core network would have to coordinate their background data transfer requests. The coordination is done such that the UE's time in deep sleep is maximized. This is difficult since the services provided by the remote servers are generally independent of each other. It would be more efficient if the UE could aggregate background data transfer requests from several applications.

According to an aspect of this application, a UE can directly access core network services and capabilities. Normally, application servers, which are remote from the UE, access core network services and capabilities via an SCEF or NEF. By showing how a UE can directly access core network services and capabilities, without the help of a remote application server, we increase the number of scenarios where core network services and capabilities can be leveraged. For example, by allowing the UE to access the core network services and capabilities directly, the services and capabilities can be charged to the UE, even if the mobile core network operator has no relationship with the application server(s) that the UE is in communication with.

The application describes a set of APIs that may be used by a UE application, or operating system (OS), to access the core network services and capabilities. These API calls hide from the UE application, or operating system, the details of how the UE accesses the services and capabilities. Where the APIs are located in relation to the UE modem and its applications are shown in FIG. 3A. Here, the service request APIs are denoted by numbers 1 and 3 encompassed within circles. The service response/indication API is denoted by number 2 encompassed within a circle.

In an embodiment, UE hosted applications are configured to access services or capabilities exposed via the UE modem. Access to these functions should include a permission request as illustrated in FIG. 3B(i). As shown, a GUI window is provided for on a display of user equipment. Here, the query in the GUI to the user is whether to grant permission to the OS to manage deep sleep for the device. FIG. 3B(ii)-(iii) are directed to a service/capability access. For example, FIG. 3B(ii) illustrates a GUI on user equipment for configuring a background data download. The GUI displays an inquiry whether to download a file in the background. The GUI also displays a deadline to be populated for carrying out the configuration. FIG. 3B(iii) illustrates a GUI on user equipment for configuring a background data upload. The GUI displays a query whether to upload the file in the background.

In one embodiment, as shown in FIG. 4, the UE can access the network's services and capabilities. Here, the UE has a provisioned APN that may be used for accessing a NEF. FIG. 4 shows architecture that allows the UE to access to the network's services and capabilities over the user plane. The UE may be provisioned with an APN that may be used to connect to a UPF that can be used to reach the network's services and capabilities. The UE may be provisioned with an IP address, FQDN, or URI that it may use to address the NEF in the data network. Alternatively, an interworking function or security gateway can sit between the UPF and NEF.

Figure 5:
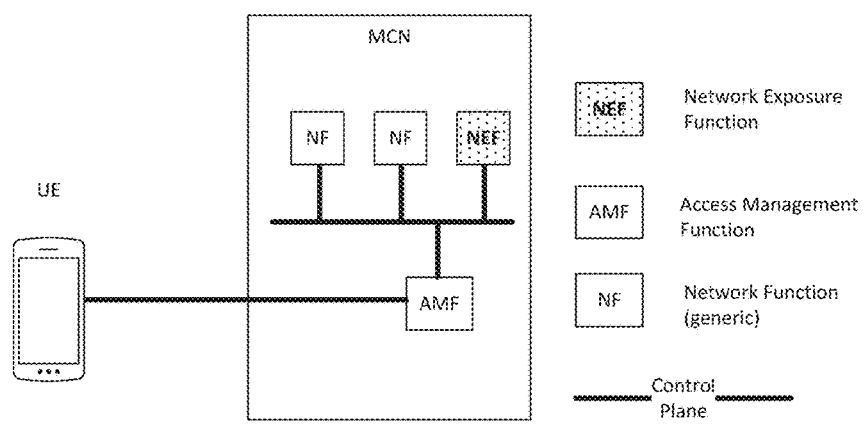
FIG. 5 illustrates network exposure via the control plane according to an aspect of the application.

In another embodiment, as shown in FIG. 5, the UE uses control plane messaging to access the network's services and capabilities. FIG. 5 shows architecture that allows the UE to access the network's services and capabilities over the control plane. The UE may send control plane messages (e.g., NAS messaging) which are routed by the AMF, towards the NEF or the particular service or capability that is being addressed. Alternatively, the AMF may direct this type of traffic towards an interworking function or security network functions where it can be processed before being routed towards the NEF or the particular service or capability that is being addressed.

Figure 6:
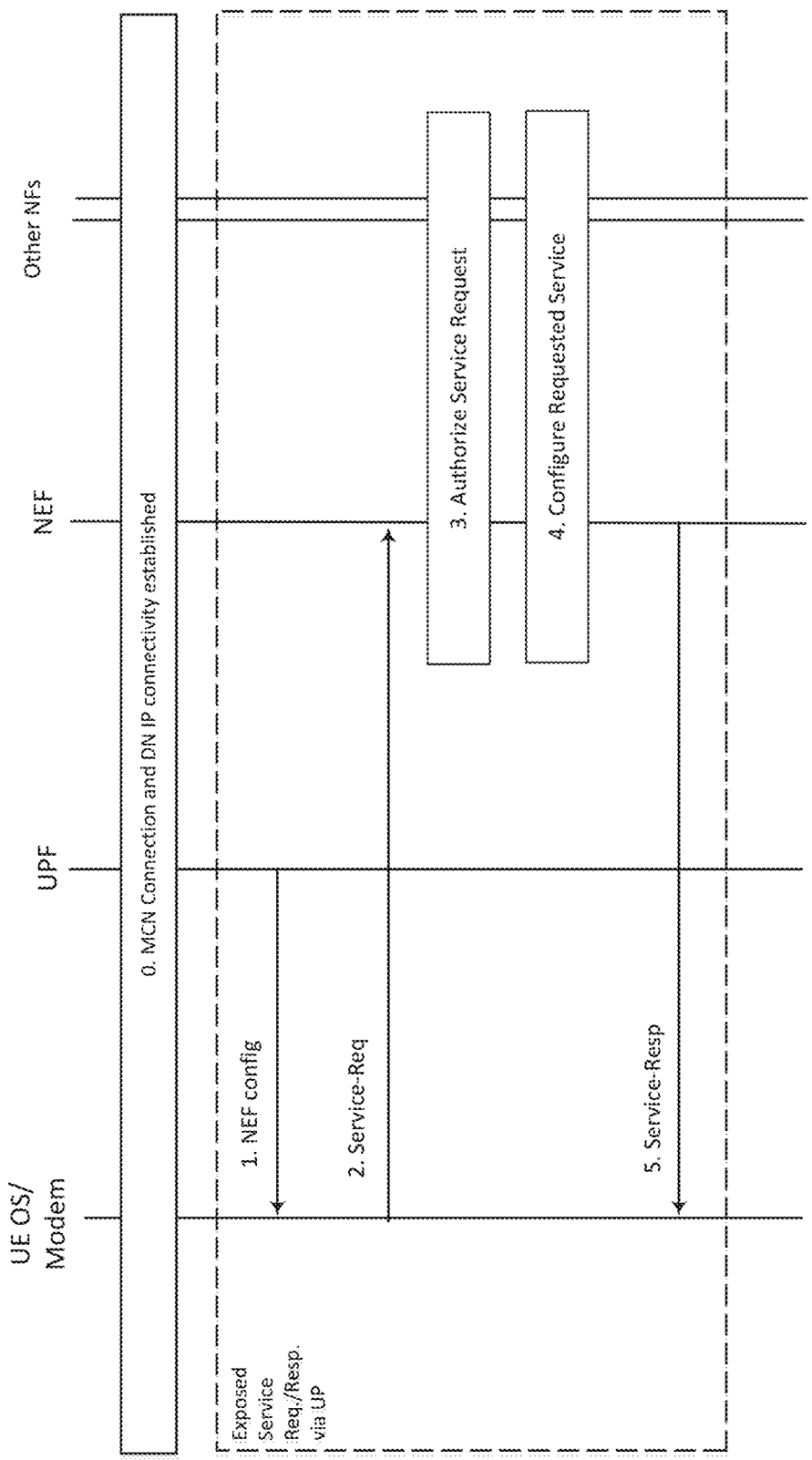
FIG. 6 illustrates service requests and responses using the user plane according to an aspect of the application.

According to another embodiment, FIG. 6 illustrates a call flow for obtaining a generic exposed service using the UP approach. Each step is denoted by an Arabic numeral. In step 0, the UE OS/modem executes the procedures necessary for establishing a connection to the network. The UP connectivity is established via UPF, which then provides IP connectivity to data networks. It is assumed that the UE is pre-configured with the information necessary to establish an IP connection to the NEF. This information may include an APN or DN name that can be used to establish a network that can be used to connect to the NEF. It may also include an IP Address, FQDN, or URI for the NEF. This information may be provisioned via a GUI.

If the necessary information was not pre-configured, the UPF may send the UE modem the necessary information for accessing the NEF for obtaining exposed network services (step 1). The configuration information may include APN, DN or FQDN information, an IP address or URI.

Using the information received in step 1 or 0, the UE modem sends requests to the NEF (step 2). This flow assumes a generic service request with examples described in more detail below. The UE is identified by its 5GGUTI. The request includes an indication of what capability, or service, is being requested by the UE. Examples of capabilities, or services, are buffering, background data transfer, communication pattern configuration, sponsored services, reachability, MO/Paging-Off Mode, and Value added services. The message may also contain the parameters necessary for configuring the capability, or service. For example, it may include the parameters described in more detail below. The request may include a slide identifier that can be used by the AMF and NEF to determine what NF is going to service the request. The request may be sent via a RESTful API.

The NEF may query the user defined message (UDM) and check that the UE is authorized to access the requested service (step 3). This step may include additional messaging between the NEF and UE to authenticate and authorize the UE. The NEF may configure other NFs to provide the requested service (step 4). For example, a request to configure a buffering service may be routed to an SMF or a UPF. The request to configure the service may include the UE's 5GGUTI, SPUI, and parameters for how the service should be configured. Depending on the service request, the UE capabilities and subscription, the NEF sends the UE a corresponding service response. This flow assumes a generic service request/response. Following a successful response, the UE Modem executes the related local processing, and can start using the service.

Figure 7:
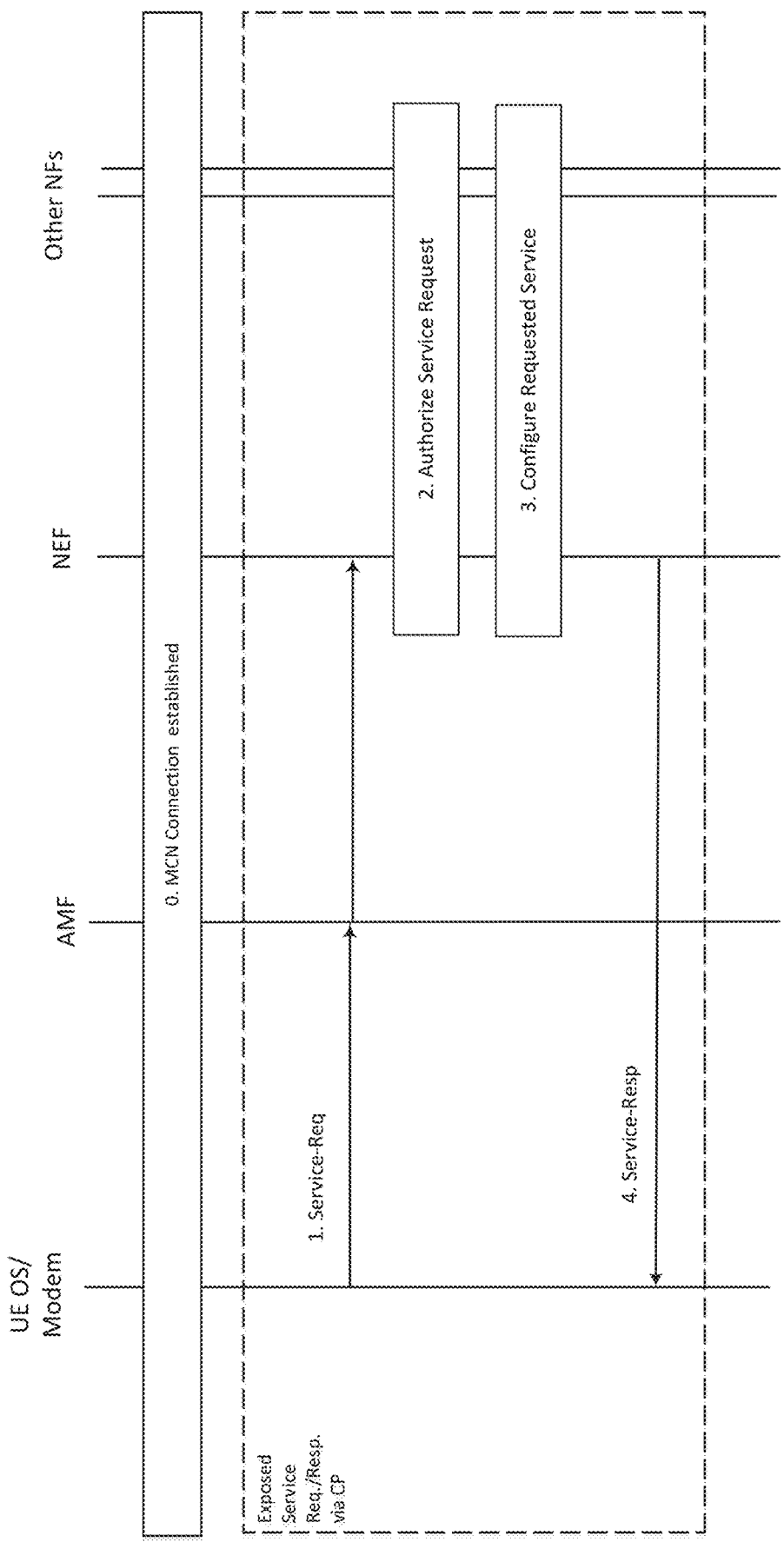
FIG. 7 illustrates service requests and responses using the control plane according to an aspect of the application.

According to another embodiment as shown in FIG. 7, a call flow for obtaining a generic exposed service using the CP approach is described. Each of the steps is denoted by an Arabic numeral. Here, the UE OS/modem executes the procedures necessary for establishing a CP connection to the network. Optionally, IP connectivity is established. It is assumed that the UE is pre-configured with the information necessary to access AS in the Data Network.

The UE modem sends a request to the network, which is routed to NEF by the AMF (step 1). This flow assumes a generic service request. The UE is identified by its 5GGUTI. The request includes an indication of what capability, or service, is being requested by the UE. Examples of capabilities, or services, are buffering, background data transfer, communication pattern configuration, sponsored services, reachability, MO/Paging-Off Mode, and Value added services. The message may also contain the parameters necessary for configuring the capability, or service. The request may include a slide identifier that can be used by the AMF and NEF to determine what NF is going to service the request.

Alternatively, the AMF could route the message directly to the NF that is to service the request. For example, it may route a request for configuring a buffering service directly to a NF. The AMF may need to use the UE's SPUI or 5GGUTI and the service identifier to determine what NF is to service the request.

The NEF may query the UDM to check that the UE is authorized to access the requested service (step 2). Alternatively, the AMP may authorize the request by querying the UDM to check that the UE authorized to access the requested service.

The NEF may configure other NFs to provide the requested service (step 3). For example, a request to configure a buffering service may be routed to an SMF or a UPF. The request to configure the service may include the UE's 5GGUTI, SPUI, and parameters for how the service should be configured. Depending on the service request, the UE capabilities and subscription, the NEF sends the UE modem a corresponding service response. This flow assumes a generic service request/response.

Following a successful response, the UE Modem executes the related local processing and can start using the service.

Introduction to Functionality Enabled by Exposure

Core Network Services may be exposed to UE applications, UE service layers, and the UE OS by the UE modem. In the following descriptions we assume the modem interacts with UE applications and service layers via an API provided by an operating system (OS). However, the API may alternatively be exposed by the modem. Although the APIs are described as being used by applications running on top of the OS, the API's may be exposed by a service layer and accessed by an application or exposed by the OS and accessed by a service layer. Table 2 provides a list of APIs.

TABLE 2

| Exposed Network Services APIs |
| --- |
| Buffer Configuration |
| Background Data Transfer |
| Sponsored Services |
| Enhanced Reachability |
| Paging Off Mode |
| Value Added Services |
| Connection Status APIs |
| Monitoring Data Rates |
| Managing EAB |
| Managing Back Off |
| Managing Suspend Resume |
| Managing Deep Sleep |
| Communication Patterns |
| Connection Configuration APIs |
| Low Access Priority |
| Connection preference Configuration |
| Configuration for Event Reporting |
| Platform Status APIs |
| Battery |
| Memory |
| Peripheral |

Buffer Configuration

Applications may want to configure a buffering service in the network slice to limit the number of packets that can be held in the buffer so that the sensor is not deluged with traffic upon wake up. This information may be provided by the applications to the modem, which aggregates this information, since the network settings will apply per UE.

TABLE 3

| Element | Type | Description |
| --- | --- | --- |
| Application ID | Int | Application Identifier (may be a port number) |
| Max number of packets | Integer | Indicates the maximum number of packets to be buffered for this application (alternatively or additionally, a packet size may be provided in bytes) |
| Buffering policy | Complex | Indicates how the buffered packets should be treated, e.g., keep latest or keep oldest. |
| Validity time | Time | Indicates for how long this buffering configuration applies. |

TABLE 4

| Element | Type | Description |
| --- | --- | --- |
| Application ID | Int | Application Identifier |
| Configured max number of packets | Integer | Indicates the maximum number of packets configured by the network to be buffered for this application |
| Configured buffering policy | Complex | Indicates the buffering policy configured in the network |
| Validity time | Time | Indicates for how long this buffering configuration applies. |

Figure 8:
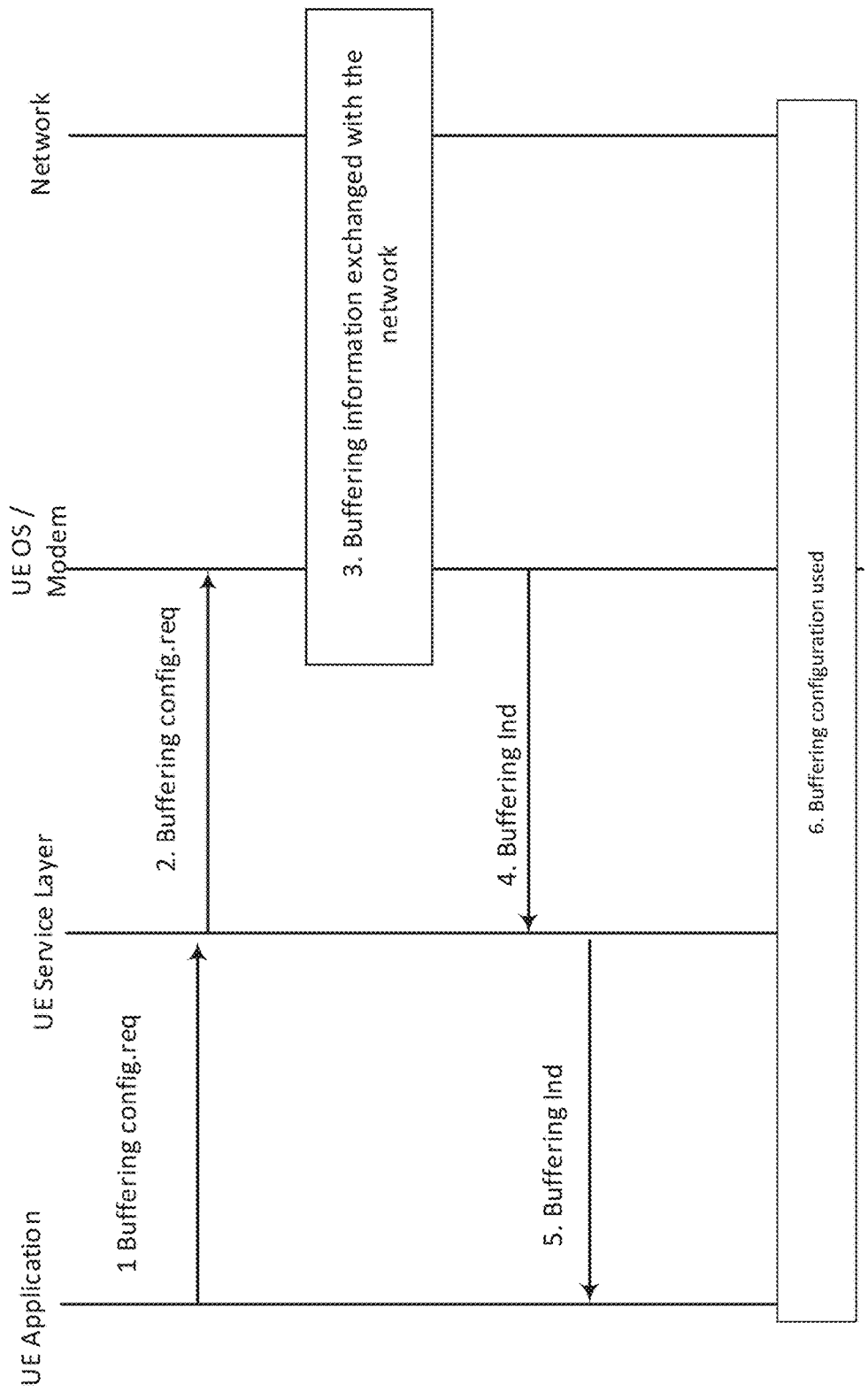
FIG. 8 illustrates a buffer configuration call flow according to an aspect of the application.

FIG. 8 illustrates how the buffer configuration API may be used. Each of the steps is denoted by an Arabic number. In step 1, a UE application wanting to configure a buffering service in the network sends a Buffering Configuration request to the UE service layer. In step 2, the UE service layer sends the buffering configuration request to the UE OS/Modem. Alternatively, a UE application could make this request directly to the UE OS/Modem, In step 3, the UE OS/Modem creates a request for buffering services for the UE and exchanges it with the network. The network signals to the UE the information about the available/granted buffering services. This procedure corresponds to the generic service request procedure detailed above, where either the UP or the CP approaches may be used.

The buffering request provided to the network may include parameters such as: size of buffer allocated, type of buffer, maximum latency, etc. Alternatively, the request may include only a qualitative measure (e.g., "cheapest service", "highest latency available" etc.). The request/response procedure may also involve additional messages to provide for negotiation of the service parameters. The information provided to the network in this step has been aggregated by either Service Layer or UE OS/Modem, and provides a configuration per UE.

In step 4, a buffering indication message is sent by the UE OS/Modem to the UE Service Layer. Next, the UE Service Layer forwards the buffering indication message to the UE Application(s) that requested the service (step 5). Last, the new buffer configuration is used by the network configuration and understood by the UE (step 6).

Background Data Transfer (BDT) Configuration

To minimize the number network connection attempts and the time spent in connected radio state, the UE may provide the network with a BDT preference. The network responds with an assigned configuration/policy for the assigned background data traffic (BDT) window. The related information may include the expected amount of data and a time window for the next transfer. These BDT windows/policies can be used by the UE in many ways, e.g. for scheduling UL traffic, for DL traffic which is initiated/triggered by the UE without coordination with the AS. It can also be used when the UE can provide coordination of background data for several applications running on it, or when the AS does not have a business relationship with the MCN and as such it cannot request BDT policies.

In another embodiment, UE applications may use the information available about the next available Background Data Transfer for this UE for scheduling their processes.

Table 5 provides BDT requests from an application. Table 6 below provides a UE BDT response from the modem. Table 7 provides a UE BDT start indication from the modem.

TABLE 5

| Element | Type | Description |
| --- | --- | --- |
| Application ID | Int | Application Identifier |
| BDT preference | List | Indicates preferences for the BDT request, e.g. desired time window, desired data transfer size, desired QoS, indication if the flow is sponsored or not, maximum cost basis, etc. |
| BDT Information request | Bool | Indicates if the application should be provided indications by the OS/Modem when the BDT windows start |
| Validity time | Time | Indicates for how long this request applies. |

TABLE 6

| Element | Type | Description |
| --- | --- | --- |
| Time window start | Time | The start of the next scheduled Background Data Transfer |
| Time Window | Time | Time window for the background data transfer. |
| QoS information Cost/policy information | List | Indicates allocated data transfer size, QoS, etc. Indicates the policy allocated for the BDT, which may provide cost information. The UE might be pre-configured with pricing information for each policy, or the indication might be abstracted, e.g. sponsored/free/normal. |
| Context information | | If the BDT provided by the network is allocated to several applications, the OS/Modem might inform each application of any associated context/restrictions, e.g. BDT time-shared, BDT bandwidth-shared. |

TABLE 7

| Element | Type | Description |
| --- | --- | --- |
| Time Window | Time | Time window for this background data transfer. |

Figure 9:
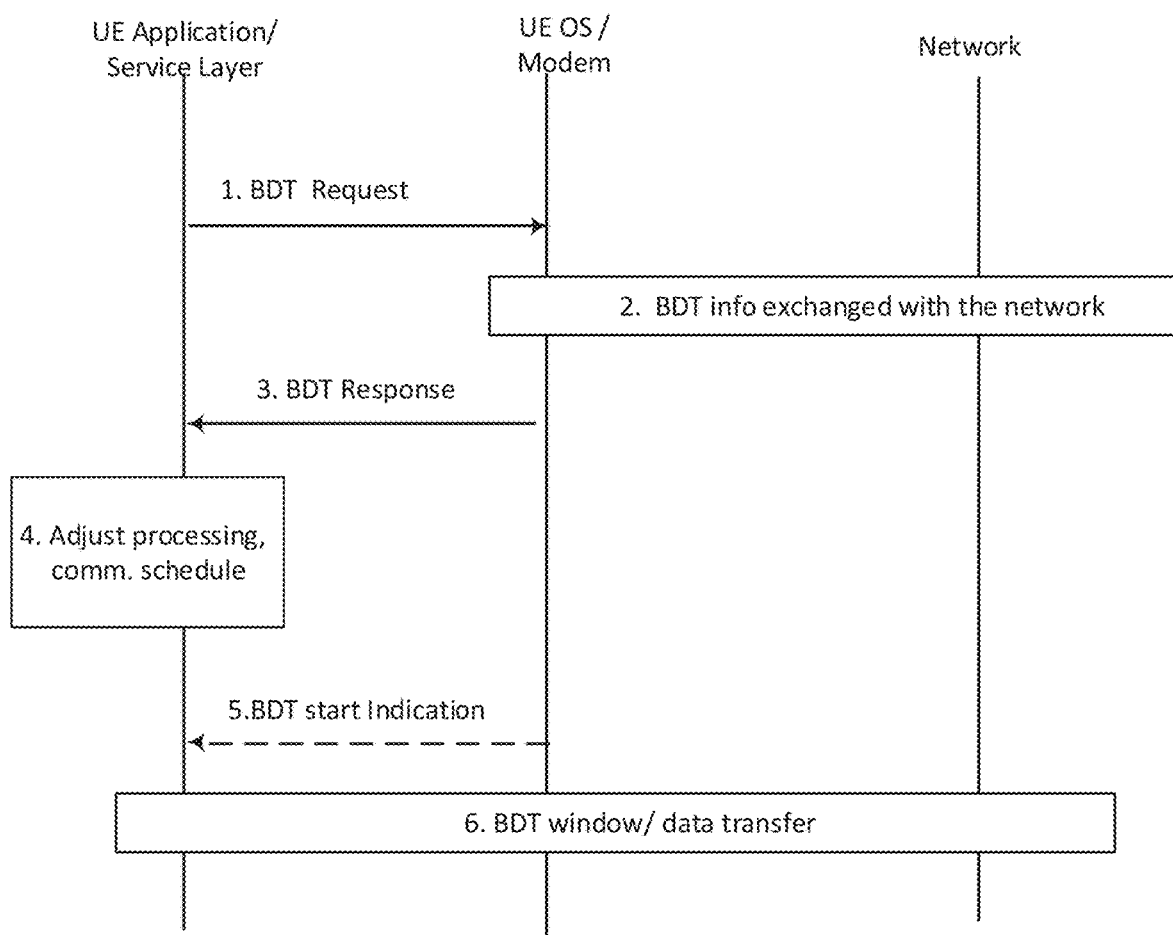
FIG. 9 illustrates a background data transfer configuration call flow according to an aspect of the application.

According to another embodiment, a BDT configuration call flow is illustrated in FIG. 9. The steps are denoted by Arabic numerals. In step 1, the UE application sends a BDT Request message to the UE OS/Modem requesting BDT services, including information about its BDT preferences. This request may also be sent by a service layer, and may include requests for indications to be provided by the UE Modem right before a scheduled BDT.

In step 2, the UE OS/Modem creates a request for BDT which may be based upon one or more application requests. Note that either a Service Layer or the Modem may perform the task of concatenating BDT requests from several UE Applications.

The BDT Request/Response procedure is performed, during which the UE is provided with the parameters for an allocated BDT occasion. This procedure corresponds to the generic service request procedure discussed above, where either the UP or the CP approaches may be used. Note also that the messaging between the UE Modem and the network may involve several messages, to provide the possibility to negotiate the BDT parameters.

The BDT request provided to the network may include parameters such as: desired time window, desired data transfer size, desired QoS, indication if the flow is sponsored or not, maximum cost basis, etc. Alternatively, the request may include only a qualitative measure (e.g. "next window available", etc.) The request/response procedure may also involve additional messages to provide for negotiation of the service parameters.

In step 3, the UE OS/Modem provides information about the next available BDT, such as window start and length to the requesting UE applications or the service layer. Either the service layer or the modem may perform the task of distributing the allowed BDT between UE applications. For example, the time window may be split among adjacent time slots, and each application may be aware only of an individual slot. Alternatively, each application may be provided with the full BDT window available, but may have a smaller amount of data available for transfer.

In step 4, the UE Application/Service Layer may adjust processing, communication schedule, etc. according to the next window for data transfer. Assuming that BDT Start Indications have been requested in step 1, the UE OS/Modem provides an indication right before the start of the window (step 5). Finally, data transfer occurs during the scheduled BDT window (step 6).

Sponsored Services

UE hosted applications may generate some sponsored traffic, which is traffic that should be charged to a different entity, usually a provider which has a business relationship with the MNO.

This information may be used by the modem in establishing connections. Specifically, the modem may request that only sponsored connectivity is established. The indication might be given with every new connection establishment procedure, or applications may indicate a more persistent configuration, e.g., all traffic from this application needs to be sponsored.

TABLE 8

| Element | Type | Description |
| --- | --- | --- |
| Application ID | ID | Application Identifier |
| APN Name | Text | The APN that will be accessed by the application for sponsored services |
| Access Level | Complex | e.g. Sponsored Only, Sponsored preferred, etc. |
| Requested QoS | Complex | A QoS Setting that will be mapped to an EPC QoS Setting and used during session establishment |

Figure 10:
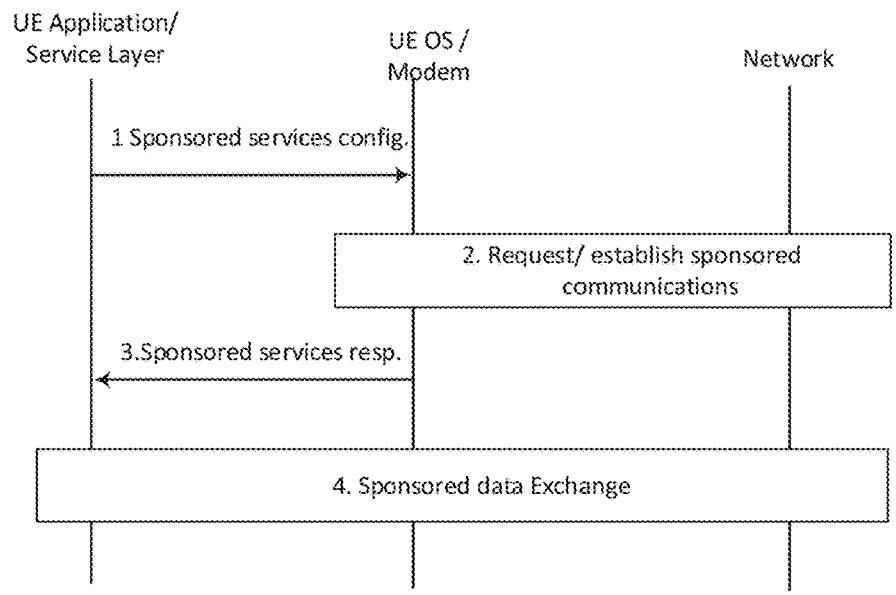
FIG. 10 illustrates a sponsored services API call flow according to an aspect of the application.

FIG. 10 illustrates how the sponsored services API are employed. Each of the steps in denoted by an Arabic number. In step 1, the UE application or the service layer sends the sponsored services configuration API to the UE OS/Modem, indicating e.g. the APN that will be accessed for sponsored services, access level, requested QoS. This information may be provided as a configuration for all future communications from this Application, or of a certain type. Alternatively the information may be provided along with each request to establish communications.

According to step 2, the connection for sponsored communications is requested and established, using the parameters provided in step 1. This procedure corresponds to the Generic Service Request procedure described above, where either the UP or the CP approaches may be used. The sponsored services request provided to the network may include parameters such as: specific service type, APN, etc.

Next, the UE OS/Modem provides an indication to the UE application/service layer that the sponsored services have been configured and may be used (step 3). Finally, the sponsored data exchange is performed in step 4.

Enhanced Reachability

According to another embodiment, and depending on the services offered, an application may need very fast connection availability. This may be provided by keeping the UE in a CONNECTED mode and not allowing it to release its resources. The network node will keep track of how long the UE is in this state so that it can be charged appropriately. Table 9 provides elements for an enhanced reachability request from an application.

TABLE 9

| Element | Type | Description |
| --- | --- | --- |
| Application ID | ID | Application Identifier for the requester |
| Allowed APN Name | Text | The enhanced reachability request may be limited to access to a specific APN, which might or might not support sponsored services |
| Allowed Port | Int | The request may be limited to communications via a specific port. |
| Allowed Applications | ID | List of UE applications allowed to use resources during the Enhanced Reachability mode |
| Access Level | Complex | e.g. Sponsored Only, Sponsored preferred, All etc. |
| Requested QoS | Complex | A QoS Setting that will be mapped to an EPC QoS Setting and used during the prolonged CONNECTED mode |
| Connection preference | | Connection preference settings as detailed in section Error! Reference source not found. Indicates for what type of connections the network needs to provide the additional resources required in this mode. |
| Connection expiration time | Time | Indicates for how much additional time the UE CONNECTED mode should be maintained for, if no new communications are initiated |
| Validity time | Time | Indicates how long this request for enhanced reachability is valid for. |

Figure 11:
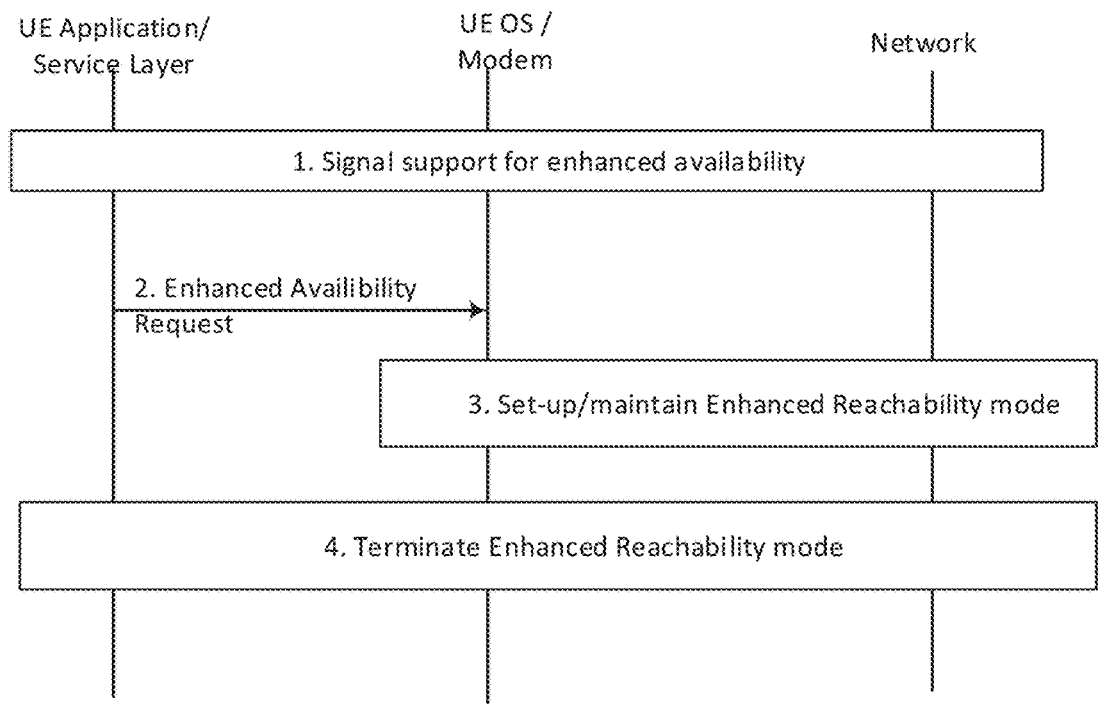
FIG. 11 illustrates an enhanced reachability API call flow according to an aspect of the application.

According to another embodiment, an enhanced reachability API call flow is shown in FIG. 11. Each step is denoted by an Arabic numeral. In step 1, each of the relevant entities (UE Application/Service Layer, UE OS/Modem and the Network) signal their support for enhanced availability. Next, the UE application/Service Layer sends the Enhanced Availability Request to the UE OS/Modem (step 2). In step 3, the UE Modem and the Network set up and maintain Enhanced Reachability mode, using the parameters obtained in step 2 as well as UE subscription data and network policies. This procedure corresponds to the generic service request procedure detailed above where either the UP or the CP approaches may be used.

The request provided to the network may include parameters such as: desired start time, desired end time or duration, etc. The UE OS/Modem may provide indications to the UE application/service layer either after the e-receipt of the enhanced availability request, after the enhanced reachability mode has been set and maintained for the requested time, or both.

In step 4, the enhanced reachability mode is terminated (at all relevant nodes) based on parameters provided by the UE (e.g., connection expiration time), or the network (e.g., local policies).

Paging Off Mode

According to yet another embodiment, the UE Application may be able to indicate support for "Paging Off" mode in which functionality is maintained while no paging is expected. As a result, the network is able to turn off paging signaling to the UE. The UE Modem performs registration upon the expiration of a registration timer provided by the network.

TABLE 10

| Element | Type | Description |
| --- | --- | --- |
| Application ID | ID | Application Identifier for the requester |
| Allowed APN Name | Text | The enhanced reachability request may be limited to access to a specific APN, which might or might not support sponsored services |
| Allowed Port | Int | The request may be limited to communications via a specific port. |
| Allowed Applications | ID | List of UE applications allowed to use resources during the Enhanced Reachability mode |
| Access Level | Complex | e.g. Sponsored Only, Sponsored preferred, All etc. |
| Requested QoS | Complex | A QoS Setting that will be mapped to an EPC QoS Setting and used during the prolonged CONNECTED mode |
| Connection preference | | Connection preference settings. Indicates for what type of connections the network needs to provide the additional resources required in this mode. |
| Connection expiration time | Time | Indicates for how much additional time the UE CONNECTED mode should be maintained for, if no new communications are initiated |
| Validity time | Time | Indicates how long this request for enhanced reachability is valid for. |

Figure 12:
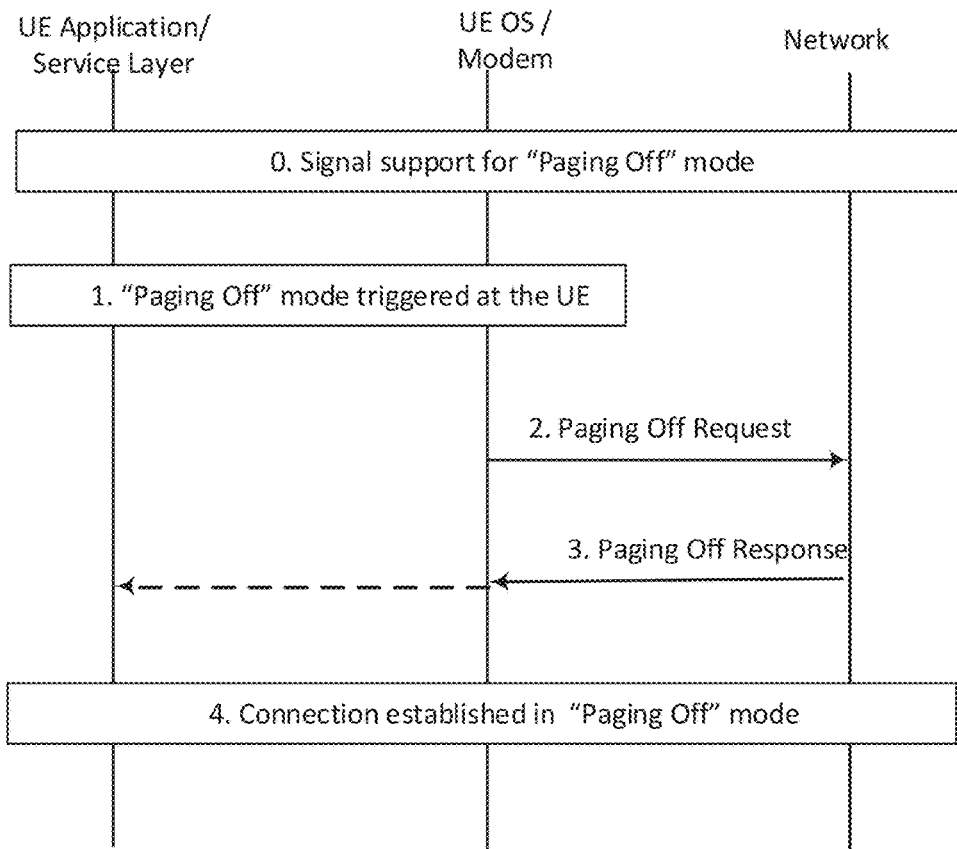
FIG. 12 illustrates a paging off API call flow according to an aspect of the application.

FIG. 12 shows a call flow for paging off mode API. Each of the steps is denoted by an Arabic numeral. Each of the relevant entities (UE Application/Service Layer, UE OS/Modem and the Network) signal their support for Paging Off mode (step 0).

In step 1, when the functionality demands it, the Paging Off mode is triggered at the UE either by the UE application, service layer, or the UE OS/Modem.

In step 2, the UE OS/Modem sends a Paging Off request to the network. The request may include a specific start time, optional stop time or duration. In step 3, the network responds with a response which may include the exact start time. The response may be forwarded to the service layer or UE application that requested it, or to all applications on the UE. In step 4, both the UE and the network enter Paging Off mode, during which paging this UE is not available. The UE OS/Modem, as well as Applications adjust their processing. The UE might inform remote servers of its unavailability for paging as well.

Value Added Services

In another aspect of this application, the API may be called to configure Value Added Services that may be offered by the mobile network operator. Examples of Value Added services are parental controls, header compression, video compression, encryption/decryption, virus/malware scan, etc.

TABLE 11

| Element | Type | Description |
| --- | --- | --- |
| Application ID | ID | Application Identifier for the requester |
| UE ID | SPUI or 5GUTI | |
| Service ID | ID | The name or identifier associated with the requested service |

TABLE 11-continued

| Element | Type | Description |
| --- | --- | --- |
| Service Config. | | The description of how the service should be configured |

Monitoring Communication Volume

The modem can monitor usage of the Underlying Networks over given periods of time: attempted communications, failed attempts and successful attempts.

An API may provide this information to the SL, which in turn will enable it to restrict Application data usage (to correlate with existing CMDH functionality and communication policies)

An application might use simple information such as the counts of failed attempts since a network connection was first established. This information may be used for example to decide to cancel a request to establish communications to the network. Alternatively, a request might be cancelled if the network connection is lost more than a certain number of times within an hour.

TABLE 12

| Element | Type | Description |
| --- | --- | --- |
| Application ID | Int | Application Identifier |
| Monitoring duration and periodicity | Time | Indicates a reporting schedule. The complex attribute may provide ways to schedule periodic reporting or single requests, an overall duration, etc. |
| Monitoring scope | List of Int or list of String | Scope of the monitoring might be per UE or per Application. When monitoring per application is requested additional information may be provided, e.g. TCP port |
| Reporting information | List of Int | List of parameters to be reported, e.g. number of attempted communications for this Application, number of attempted communications by the UE, data usage for this Application, PDUs per APN, number of bits, number of messages, etc. |

TABLE 13

| Element | Type | Description |
| --- | --- | --- |
| Application ID | Int | Application Identifier |
| Period reported | Time | Indicates the period to which the report corresponds. It may be provided as an index into a schedule, as a time period, etc. |
| Attempted communications | Int | Number of attempted communications during the period and scope (e.g. per Application or per UE) |
| Failed Communications | Int | Number of failed communications during the period and scope (e.g. per Application or per UE) |
| Successful attempts | Int | Number of successful communications during the period and scope (e.g. per Application or per UE) |
| Data usage | Int | Amount of data transferred during the period and scope (e.g. per Application or per UE) |
| APN rate control | Int | Number of packets per time unit per APN, when APN based congestion control is applied |

Figure 13:
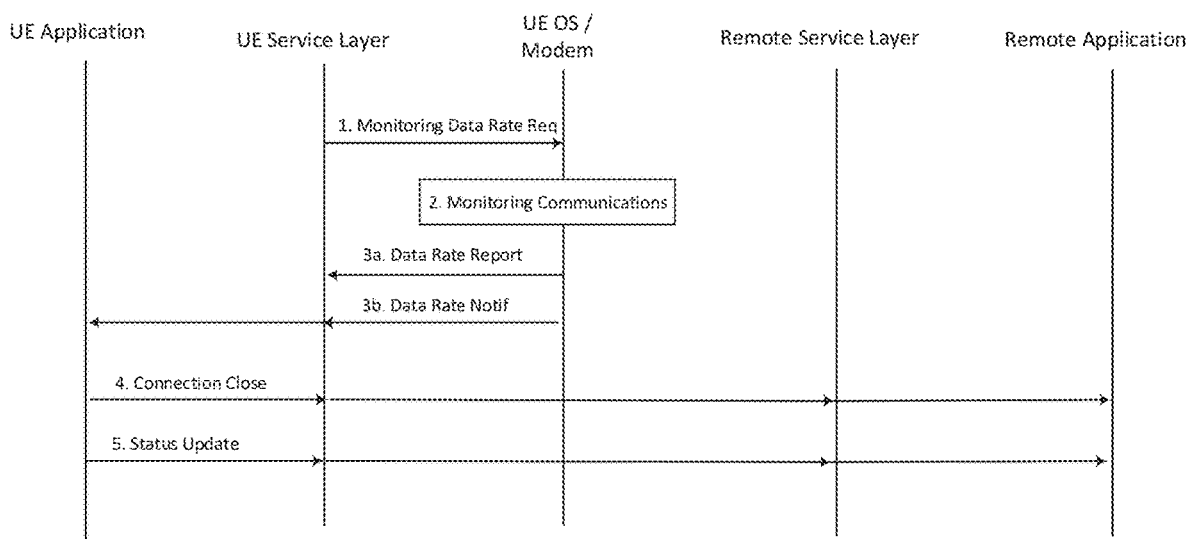
FIG. 13 illustrates a monitoring API call flow according to an aspect of the application.

FIG. 13 illustrates a call flow for monitoring APIs. In step 1, the service layer requests to be notified if a certain number of messages, or bits are sent by the UE, by the service layer, by a certain application, on a certain port number, to a certain IP address, etc. Alternatively, an UE Application could make this request directly to the UE OS/Modem, or the UE Service Layer may aggregate requests from several UE Applications.

In step 2, the UE OS/Modem performs monitoring of data rates according to the configurations set by the service layer and/or the UE applications.

In step 3, the UE OS/Modem responds to the request. Depending upon the request settings, a one-time report (step 3*a*) with the current data usage threshold may be provided.

In step 4, if the request indicates it, additional or alternative notifications may be provided (step 3*b*), e.g., the UE OS/Modem sends notifications to the UE service layer indicating that a usage threshold has been met or is approaching (within a predetermined tolerance). The service layer may forward the notification to a UE application or the notification may be sent directly to the UE application.

In step 5, the UE Application, after becoming aware of the data threshold being met or approaching, may close its connection with the UE Service Layer, Remote Service Layer, and/or Remote Application. This step may entail simply de-registering from the remote service layer and applications or it may also include updating data structures or resource before battery failure.

Alternatively, the UE application after becoming aware of the data threshold being met or approaching, may update its status in the UE Service Layer or Remote Service Layer to indicate that it is connected but does not want to perform any data plane communication for a period of time (step 6). The UE application may still be considered reachable by the remote Service Layer and Application for emergency communication, but the remote Service Layer and application may be informed that additional commination will incur an additional charge or should be sponsored.

Managing Extended Access Barring

According to an embodiment, when the UE detects that it is under EAB, the applications may use an indication that the UE is under EAB in order to change communication scheduling. If the UE is capable of overriding EAB, an API for letting the application decide if EAB should be overridden such as shown in the Table 17 below, may be used by applications.

TABLE 17

| Element | Type | Description |
| --- | --- | --- |
| Application ID | Int | Application Identifier |
| EAB Overriding functionality | Int | The application indicates if it uses functionality to request EAB overrides. Note that as of Release 13 the capability to request EAB overrides is given per UE. However not every application on the UE might implement functionality to use this feature. In addition, in future releases the overriding capability may be given per application, in which case the ID is unique within the system. |
| EAB Information Request | Bool | Indicates if the application should be sent EAB stored in the modem (e.g. UE Access Class) and/or information broadcasted by the network (e.g. serving PLMN, barring rates, mean duration of access control, etc.) |
| EAB Status Indication Request | Bool | Indicates if the application should be sent EAB status indications. |

TABLE 18

| Element | Type | Description |
| --- | --- | --- |
| Application ID | Int | Application Identifier |
| EAB Override request | Int | The application requests an EAB override with the upcoming communication request, if the request will be handled when the UE detects EAB. Alternatively the EAB override request might be provided with the communication request. |

TABLE 19

| Element | Type | Description |
| --- | --- | --- |
| Application ID | Int | Assigned by the OS and local to the UE. The information might be sent to one or multiple applications |
| UE Access Class | Int | Information about the Access Class the UE is configured for, for use by applications implementing dependent features. |
| EAB designation | Bool | Indicates if the UE is configured for EAB by HPLMN |
| EAB Override designation | Bool | If the UE is configured with EAB, indicates if it is also configured by the HPLMN with a permission to override EAB. |
| EAB info | Complex | Information about EAB which might be received by the UE from the serving network via broadcast. It may include serving PLMN, barring rates, mean duration of access control, type of access attempts to apply barring to, etc. Note that the EAB info may be provided independently of the other EAB Information, every time the serving PLMN provides new information |

TABLE 20

| Element | Type | Description |
| --- | --- | --- |
| Application ID | Int | Application Identifier The indication might be sent to one or multiple applications |
| Barring Indication | Int | The UE determines the barring status. If the access attempt is not allowed, this indication alerts the application that further attempts are barred for some time, in order for the application to schedule re-tries and further communications. |
| Barring time period | Time | Indicates the barring time period calculated by the UE based on the 'mean duration of access control' provided by the network and the random number drawn by the UE. The parameter might also include a timestamp for the initial attempt. |
| Initiator application ID | Int | Application ID of the application that initiated the access attempt that resulted in barring |
| Barred access type | Int | Type of access attempt barred, e.g. SMS, MMTEL voice, MMTEL video, etc. |

The EAB Indication provided by the UE may be explicit (as described in the tables above) or abstracted. An abstracted indication might not provide each individual parameter, but may simply indicate when a barring period begins and ends. It may also be provided in response to a connection request that results in barring.

Figure 14:
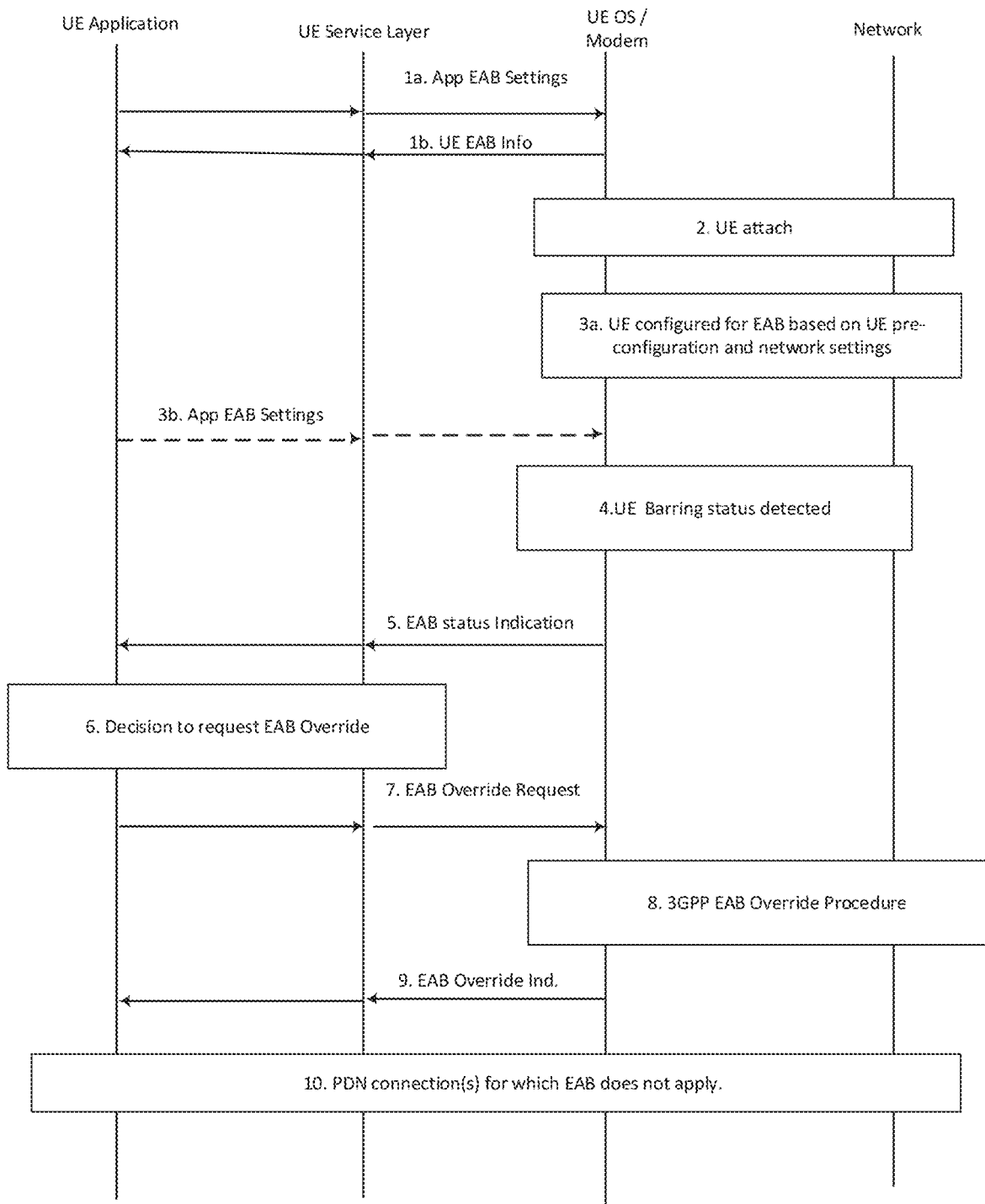
FIG. 14 illustrates an extended access barring (EAB) management API call flow according to an aspect of the application.

FIG. 14 shows an example call flow of how the EAB Management APIs might be used. Here, the UE EAB configuration is determined based on the UE Application and Modem settings. This includes, for example: (i) the UE Application sends its settings using the Application EAB Settings API to the SL, which in turn forwards it to the Modem (step 1*a*); and (2) based on the "EAB Information Request" parameter, or by default, the Modem sends EAB information to the UE application (step 1*b*). Initially, the information provided by the Modem might include only pre-configured information such as UE Access Class.

In step 2, the UE attaches to the network. Next in step 3, the UE configuration for EAB is assessed based on the modem and Network configuration, as specified by 3GPP. Optionally in step 3*b*, the Application might update its EAB settings to indicate that it requests the Modem, via the SL, indications for when the barring status is detected (EAB Status Indication)

According to step 4, when the network enforces barring such that it affects this UE, the modem is able to detect it based on broadcast information, UE Access Class, etc. (according to 3GPP standards). Next, the Modem sends the EAB Status Indication to the Service Layer, which in turn relays it to the Application(s) that requested it (step 5). The UE Application determines if an EAB Override request is needed for the upcoming operations (step 6). In step 7, the UE Application sends an EAB Override request to the Modem via the SL. The 3GPP EAB Override Procedure is executed between the Modem and the network (step 8). Further in step 9, indications of EAB override are provided by the UE OS/Modem to the requesting entity, to the service layer or to the UE applications which support it. Finally, the PDN Connection(s) for which EAB does not apply are established and used.

Managing Attach Reject/Back-Off

According to yet another embodiment, the UE can be commanded to use a long minimum periodic PLMN search time (e.g., up to 255 min) to decrease the rate at which devices will attempt to connect to a competing network after network failure. When the UE is in a situation where it is in a delayed PLMN search and attach, the modem should expose the delay time to the UE host applications. These applications may in turn re-schedule their communications.

The UE could provide an indication of the currently configured times as shown in the Tables below. This indication may be provided when a PLMN search has been rejected and a back off timer has been indicated, or any time an Attach Request has been rejected, even if no back-off timer has been provided.

TABLE 21

| Element | Type | Description |
| --- | --- | --- |
| Application ID | Int | Application Identifier |
| Attach Reject and Back-off indication request | Bool | Indicates if the application should be provided with indications at Attach reject and/or Backoff |

TABLE 22

| Element | Type | Description |
| --- | --- | --- |
| Application ID | Int | Application Identifier |
| Min PLMN search time | Int | Indicates the minimum PLMN search time currently configured at the UE |
| PLMN Search Back off timer | Int | Indicates the value of the back off timer last received e.g. at last PLMN Search |
| PLMN Search Back off timer receipt | Int | Optionally, the time at which the last PLLMN Search procedure was rejected and the back off timer received |
| Session Management Back off timer | Int | Indicates the value of the session management back off timer last received e.g. at last Attach or TAU procedure. Note that the modem may support a separate Session Management back-off timer for every APN that the UE may activate. |

TABLE 22-continued

| Element | Type | Description |
| --- | --- | --- |
| Session Management Back off timer receipt | Int | Optionally, the time at which the last Attach or TAU procedure was rejected and the back off timer received |
| NAS procedure reject causes | Int | Other causes for the NAS procedure reject may be provided |

In a different use, the UE might provide Applications with a simple request API which would result in a simple indication when the UE is attached, as in Table below.

TABLE 23

| Element | Type | Description |
| --- | --- | --- |
| Application ID | Int | Application Identifier |
| PLMN | Int | PLMN attached to |

Figure 15:
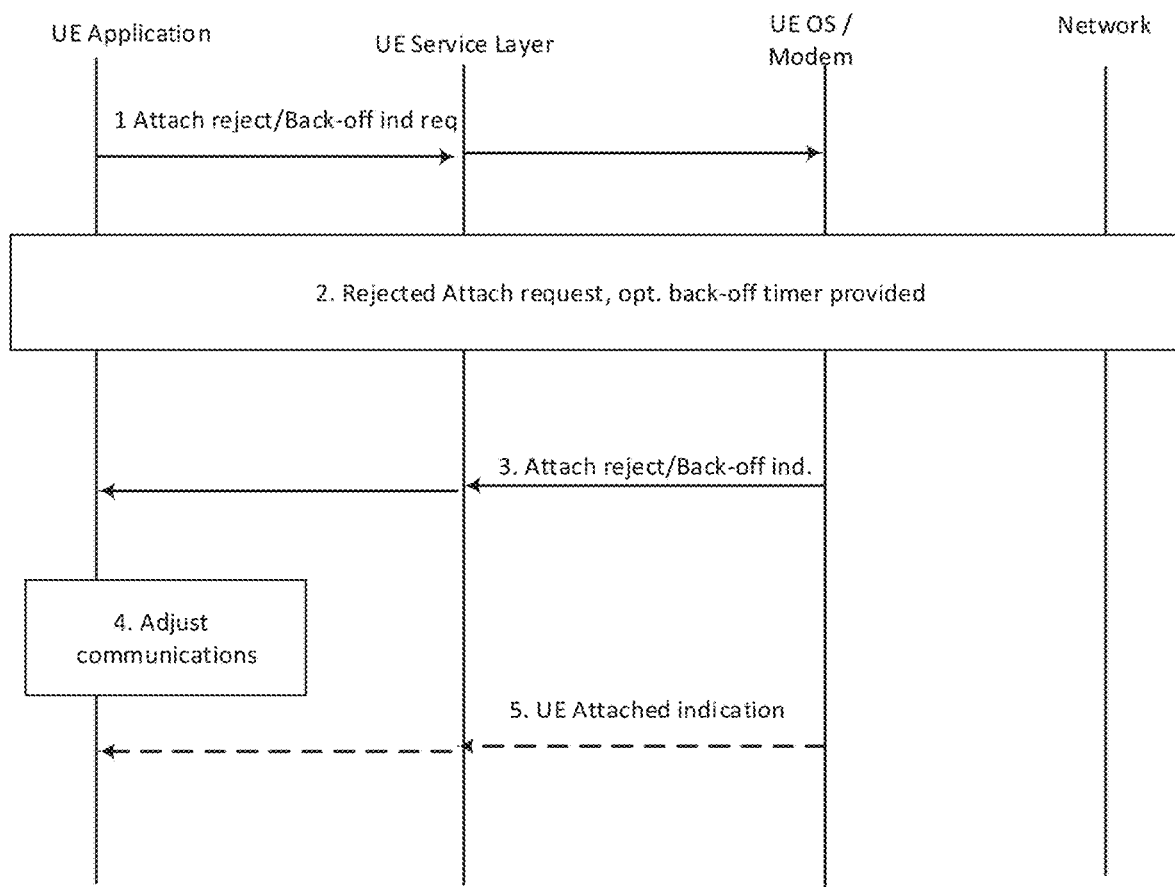
FIG. 15 illustrates an attach reject/back-off management call flow according to an aspect of the application.

In an exemplary embodiment, a call flow of how the Attach Reject/Back-off Management API may be used is shown in FIG. 15. Each step is denoted by an Arabic numeral. According to step 1, the UE Application requests being provided with indications when a back-off timer becomes active.

At a later time, a UE Attach request is rejected and a back-off timer is provided by the network to the Modem (step 2). In step 3, the modem provides an indication that the Attach request has been rejected and a back-off timer is provided. The indication is provided to the SL which forwards it to the UE Application(s) that requested it. Thereafter, UE Applications use the back-off timer information e.g. to adjust the schedule of the next communication it will request (step 4). Optionally, when the UE is again attached to the network it may indicate it to the SL and applications (step 5).

Managing Suspend/Resume

According to even another embodiment, the instant API informs the applications when the modem is suspended so that they know that they are unreachable to the SCS/AS. This API will be triggered when a suspend message is received from the network. The message will be sent to an application so that the application knows to suspend any data until a resume indicate is received. The resume indication will be sent when the UE determines to resume its connection. This may occur because of a timer expiration, a time reaching a value, or an application request.

TABLE 24

| Element | Type | Description |
| --- | --- | --- |
| Application ID | Int | Application Identifier. The indication might be sent to one or multiple applications |
| Suspend/Resume Indication | Bool | Indicates to the application that the connection to the network has been suspended or resumed. This means that the application is unreachable to the SCS/AS |

Managing Deep Sleep

Let the applications know when the modem is in deep sleep due to extended discontinuous reception (eDRX) or power savings mode (PSM). The application may provide communication schedules which the UE uses to request, during the Attach procedure, specific DRX parameters.

Alternatively, the UE may decide to use the DRX cycle length broadcast by the network.

TABLE 25

| Element | Type | Description |
| --- | --- | --- |
| Application ID | Int | Application Identifier |
| eDRX support | Integer | The application indicates if the traffic patterns should be used for negotiating eDRX support |
| Application Traffic Patterns | Complex | Indicates the optional traffic patterns for the applications, which may be used by the UE in negotiating eDRX length and for managing PSM |
| Deep Sleep Indication request | Int | Indicates if the application should be provided deep sleep information and/or deep sleep indications |

TABLE 26

| Element | Type | Description |
| --- | --- | --- |
| Application ID | Int | Application Identifier |
| UE DRX cycle | Int | Indicates the current DRX cycle length which was either negotiated with the network, (UE specific) or provided by the network in the broadcast information |
| Paging Time window length | Int | Indicates the current paging time window |
| UE PSM support | Bool | The UE indicates if it has PSM support |
| Active time | Time | Indicates the latest value provided for the Active Time timer. It may also include a timestamp for when the activity timer has been started |
| Periodic TAU timer | Time | Indicates the value of the periodic TAU timer. It may also include a timestamp for when the timer has been started |

The Deep Sleep Indication provided by the UE may be explicit (as described in the table above) or abstracted. An abstracted indication might just provide indications before going into deep sleep.

Figure 16:
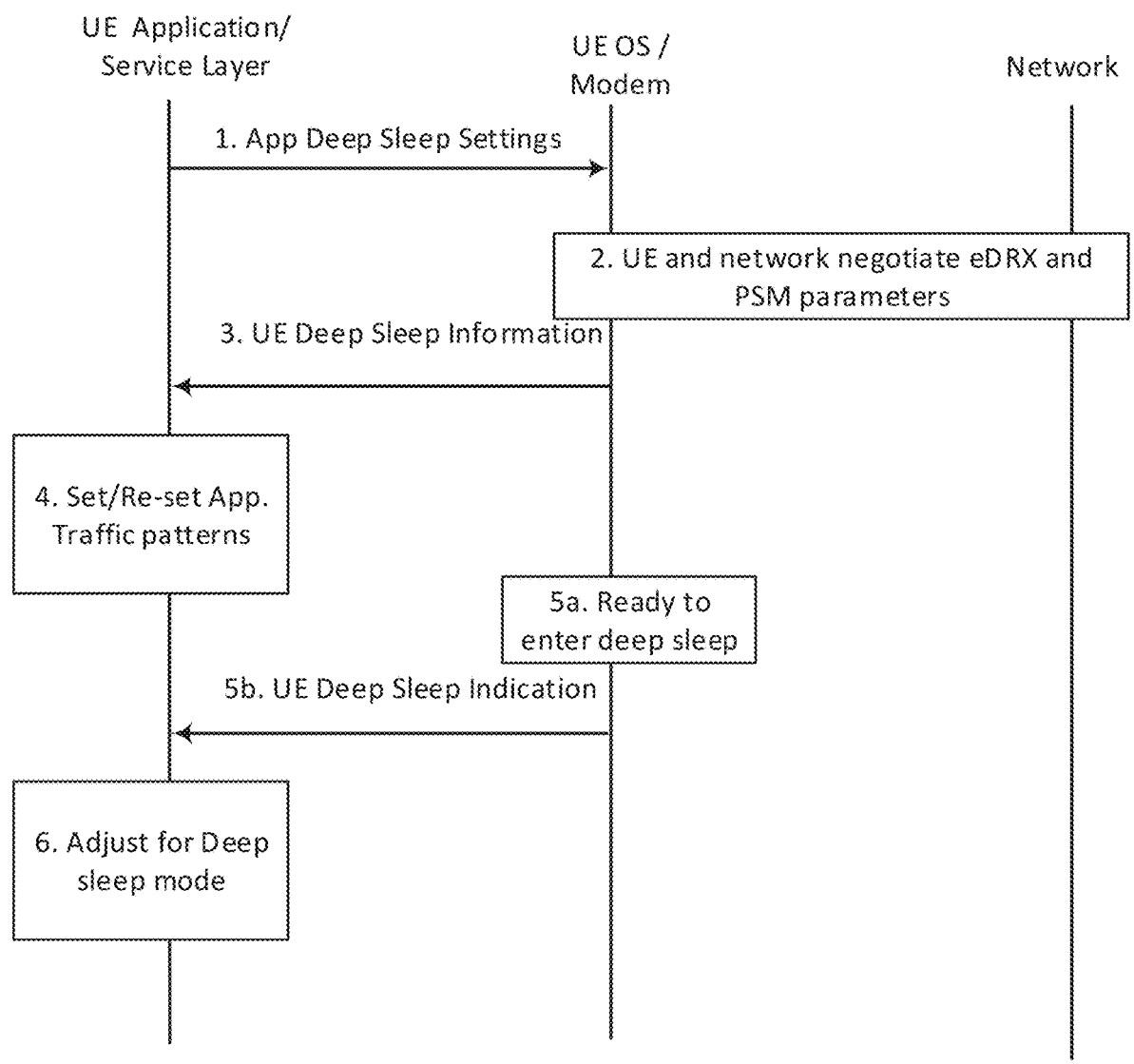
FIG. 16 illustrates deep sleep management call flow according to an aspect of the application.

According to another embodiment, FIG. 16 shows an exemplary call flow of how the Deep Sleep management APIs might be used. Each step is denoted by an Arabic numeral. In step 1, the UE Service Layer sends the Application Deep Sleep Settings Indication to the UE OS/Modem providing information such as: if it provides eDRX support, traffic patterns which should be used for negotiating eDRX parameters, etc. Note that the message might be sent based on an indication from the UE application or the UE Service Layer may manage this functionality for several UE applications. Similarly the message may be sent directly by the UE application to the UE OS/Modem.

Next, the UE OS/Modem and the network negotiate eDRX and PSM parameters (step 2). In step 3, the UE OS/Modem sends the UE Deep Sleep Indication to the originator with the negotiated parameters. Thereafter Originator uses this information, for example to adjust traffic patterns (step 4).

According to step 5, when the Modem determines that the UE is about to enter deep sleep (step 1A), the modem will send the UE deep sleep indication to the Originator if the originator requested UE Deep Sleep Indications. Last, the UE Application and/or SL may use this information to adjust functionality for entering deep sleep (step 6).

Communication Patterns

According to yet even another embodiment, the modem is expected to be able to communicate to the network about its communication patterns. This is done so that the network knows when the UE can be suspended, what eDRX cycles to use, and what PSM cycle to use. These parameters can be computed by the modem based on information exchanged with the Applications on the UE.

The following API is used by an Application to indicate when it plans to exchange data and what type of communication pattern it expects to require. This API could be used by an application to negotiate such parameters with the modem.

The API may be used to implement non-blocking behavior, in which case the application may provide a return function pointer, the function being invoked by the modem when the requested communication starts. The API may be used to implement blocking behavior, in which case the application is responsible for starting the data exchange at the indicated start time.

This information may be used by the modem to synchronize several applications so that their communication periods are aligned. By aligning their communication periods, the UE may sleep for longer periods (i.e. stay in DRX or PSM for longer periods). Aligning communication patterns may mean that both applications are told to start at the same time or right after each other

TABLE 27

| Element | Type | Description |
| --- | --- | --- |
| Application ID | Int | Application Identifier |
| Periodicity Indicator | Bool | Indicates if the schedule is provided for a one-time communication or periodic communications |
| Time period | Time | If the indicator indicates periodic communications, the period at which the pattern repeats |
| Downlink data size | Integer | The Application may indicate the amount of DL data needed for the next communication |
| Uplink data size | Integer | The Application may indicate the amount of UL data needed for the next communication |
| Start time | Time | The time for starting the data exchange |
| Time Duration | Time | The time duration for the requested connection. |
| Return Function | Pointer | A pointer to a return function that may be called when communication may start |
| Bit Rates | Integer | The bit rate required for the connection |
| Latency | Time | The latency required for the connection |
| Validity time | Time | Indicates for how long this pattern applies. It may be also indicated as number of times that the pattern should repeat. |

Figure 17:
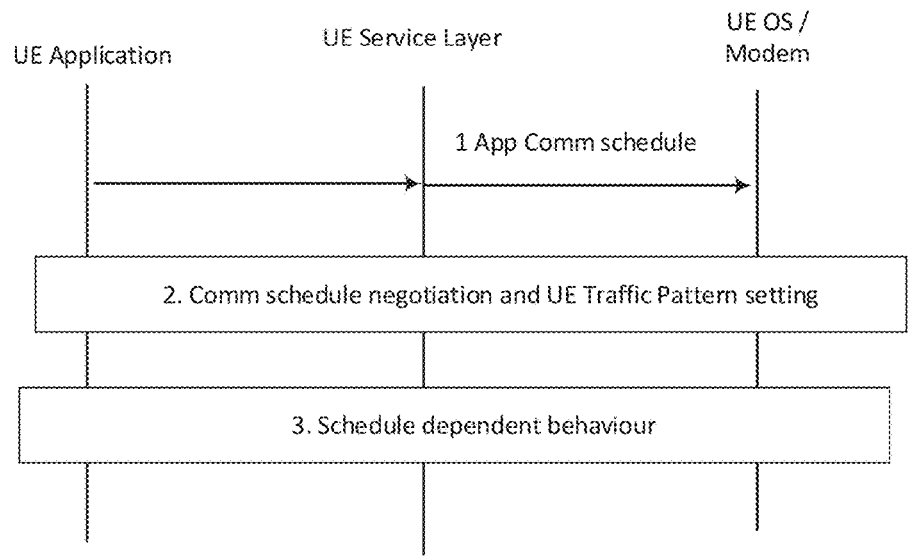
FIG. 17 illustrates a communication pattern API call flow according to an aspect of the application.

In an embodiment as shown in FIG. 17, a call flow is provided on how communication pattern APIs may be used. According to step 1, the UE Service Layer sends an Application communication schedule message to the UE OS/Modem. Note that the message may originate with the UE Application, or the UE Service Layer may manage an aggregated schedule for several UE Applications.

In step 2, the communication patterns of the entire UE are set at the UE. This may involve negotiation with the UR Applications and/or service layer. Each entity is informed of the resulting communication schedule. The negotiation procedure will be based upon local policies.

Next, the communication pattern-dependent behavior is implemented by either or all UE entities (e.g., Application Service Layer, OS/Modem). For example: (i) a negotiated result is distributed to all relevant entities; (ii) if a return function pointer is provided, the function will be invoked by the modem when the requested communication starts; (iii) the Modem implements blocking behavior offering communications only during the negotiated patterns, and the Application is responsible for starting the data exchange at the indicated start time; and (iv) the UE Service Layer and the OS/Modem may use the information for other scheduling purposes, e.g., calculate desirable UE sleep schedule.

Low Access Priority Indication According to another embodiment, when a modem sets up a PDN connection, PDP context, or performs an MM or SM procedure, it can indicate to the network that it is Low Access Priority. If it is Low Access Priority, the network can reject the message with a backoff time. When a UE is accessing the network with Low Access Priority, then the UE may be subject for longer backoff timers at overload and consequently need to be designed to be tolerant to delays when accessing the network. The following API allows the UE Applications to indicate to the Modem if their communications are low priority. The indication might be given one time, or when requesting new PDN connections.

TABLE 28

| Low Access Priority communications configuration (from Application) | | |
|---|---|---|
| Application ID | Int | Application Identifier |
| Low Access Priority indicator | Bool | Indicates weather the upcoming communication requests from this Application have Low Access Priority |
| Validity time | Time | Indicates for how long the Low Access Priority should be applied for this application |

Connection Preference Configuration

Some Applications may be able to inform cell selection procedures of the modem. For example Applications may indicate preference for connections to a specific cell, geographic location, tracking area, etc. The Application may request to be notified when the modem has coverage, connects to the specific cell, etc.

TABLE 29

| Element | Type | Description |
|---|---|---|
| Application ID | Int | Application Identifier |
| Preference type | String | Type of preference indicated, e.g. specific cell, CSG cell (proximity indication), tracking area, geo location, connection type |
| Preferences | List | Depending on preference type, it provides detail to identify the preferred connection, e.g.: Cell ID Tracking Area Geo Coordinates Wi-Fi/LTE/etc. |
| Validity time | Time | Indicates how long this configuration is valid for. |
| Preference rank | Int | Provides an indication for how the preference should be interpreted. Several implementations are envisioned, e.g. using only (mandatory, optional, indication), using ranks (rank 0. . . n). Note that the Modem may apply local policies for how to treat these preferences. |

TABLE 29-continued

| Element | Type | Description |
|---|---|---|
| | | For example, the Modem may apply a weight factor between preferences of different application, depending on their type, usage, etc. |

TABLE 30

| Element | Type | Description |
|---|---|---|
| Application ID | Int | Application Identifier |
| Current Preference type | String | Type of preference currently active in the Modem |

TABLE 31

| Element | Type | Description |
|---|---|---|
| Application ID | Int | Application Identifier |
| Preferred connection available indicator | Bool | Indicates weather the preferred connection is available. In a different embodiment the indication might be provided only when the preferred connection has been established |
| Preferred connection info. | List | May provide additional information about the preferred connection, e.g. signal strength |
| Configuration UE context | List | Provides information about the overall context of the preference configuration in the UE. For example, a number of status and error codes might indicate if all applications on the UE have the same preferences, or if there are conflicting preference requests from other Applications which cannot be mitigated based on local policies. |

Figure 18:
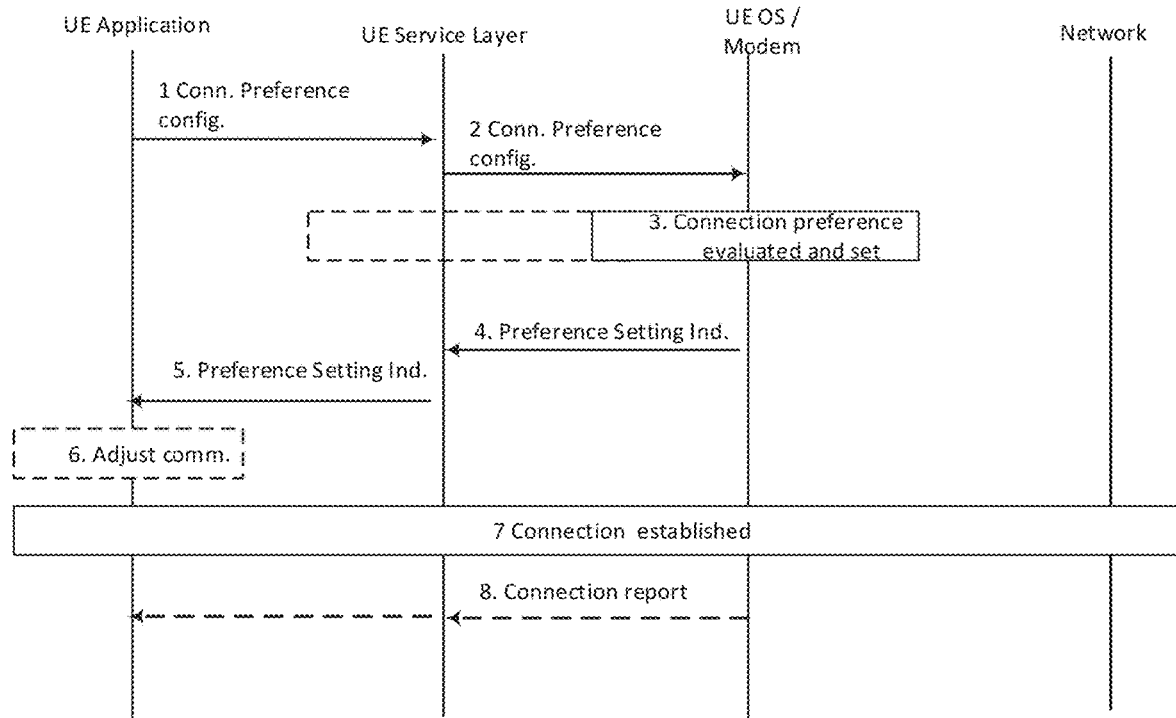
FIG. 18 illustrates a connection preference API call flow according to an aspect of the application.

In an embodiment, FIG. 18 illustrates a connection preference API Call Flow. According to step 1, the UE application sends its communication preferences to the UE Service Layer In step 2, the UE service layer forwards the connection preferences to the UE OS/Modem. Note that the UE service layer might aggregate or otherwise combine Connection preferences from several different UE applications, or might forward them directly.

In step 3, the connection preference is evaluated and applied by the UE OS/Modem, who may use other local policies for determining how to treat these preferences e.g. the rankings provided by different UE applications may be applied depending on the Application type, data usage, etc. Evaluating/combining the preferences of several different UE Applications might be done in the same manner at the SL level. In that case, the message in step 2 contains aggregate preferences for UE OS/Modem use.

According to step 4, the UE OS/Modem returns an indication with the active connection preferences resulting from the evaluation process. If the evaluation was done by the SL, this message would simply indicate that the preferences are applied at the Modem level. Next, the active connection preferences are indicated to the UE application (step 5). Based on the active connection preferences indicated by the UE OS/Modem, the UE application might make adjustments, e.g. of its local communication policies, communication timings, etc. (step 6).

According to step 8, a connection is established using the active connection preferences at the modem, and may be used by the UE application. Optionally, in step 9, a connection report message might be sent by the UE OS/Model to the SL and forwarded to the UE Application, indicating if it is a preferred connection and providing information about its settings.

Configuration for Event Reporting

According to a further embodiment, applications may be interested in receiving indications about events which affect connectivity issues. Multiple events may be configured with the same request, or separate requests may be used for each event configured

TABLE 32

| Element | Type | Description |
| --- | --- | --- |
| Application ID | Int | Application Identifier |
| Proximity indication enable | Bool | Indicates if proximity indications are enabled |
| Proximity indication CSG ID | Int | If proximity indication is enabled, it indicates the CSG IDs of the cells for which proximity indication should be provided |
| Paging indication enable | Bool | Indicates if paging indications should be provided to the application |
| Paging reason | | If paging indication is enabled, it indicates what type of paging should be indicated e.g. initiating MT PS call, initiating MTCS fallback call, providing ETWS indication etc. |
| Validity time | Time | Indicates for how long the configuration should be valid for. |

TABLE 33

| Element | Type | Description |
| --- | --- | --- |
| Application ID | Int | Application Identifier |
| Report type | Int | Indicates the type of report, e.g. proximity, paging |
| Report information | Complex | Information pertaining to the report, e.g. CSG ID for proximity indication, paging cause for paging indication |

Figure 19:
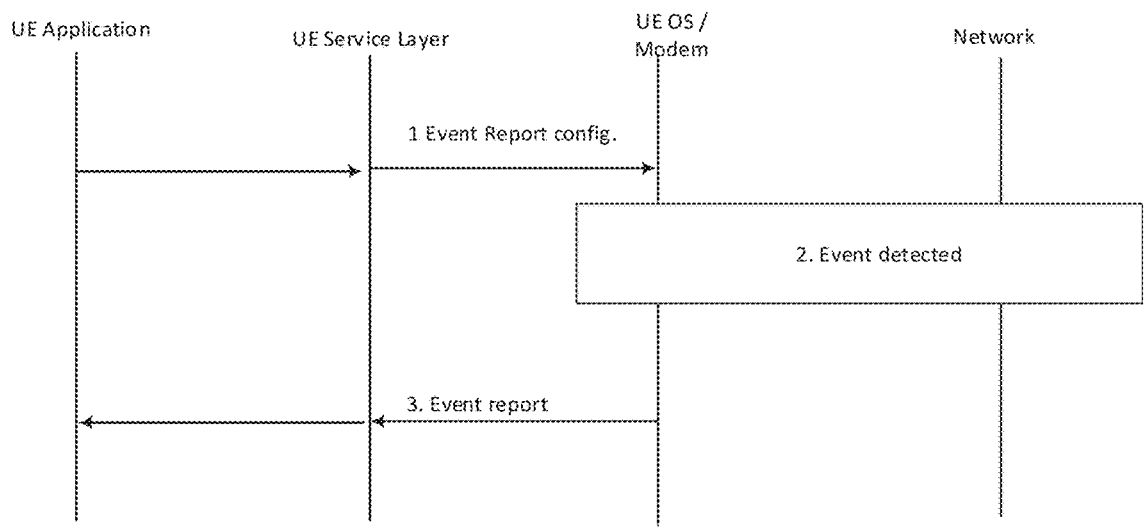
FIG. 19 illustrates an event reporting API call flow according to an aspect of the application.

FIG. 19 shows how the connection preference APIs might be used. According to step 1, the UE service layer provides an Event Report configuration message to the UE OS/Modem. Alternatively, an UE Application could make this request directly to the UE OS/Modem, or the UE Service Layer may aggregate requests from several UE Applications.

In step 2, the event is detected by the modem, on its own or via interactions with the network. In step 3, an Event Report message is sent by the UE OS/Modem to the UE Service Layer, which might forward it to the UE Application(s) that requested it.

Battery Status

In yet even a further embodiment, the UE hosted applications may need to use the status of the battery in their functionality, so they may provide a request to be informed such a status by the modem.

TABLE 34

| Element | Type | Description |
| --- | --- | --- |
| Application ID | Int | Application Identifier |
| Battery Status type | Text | The type of status request to be provided, e.g. periodic, threshold, continuous, one time. The application might also request its own power consumption relative to the overall consumption |

TABLE 34-continued

| Element | Type | Description |
| --- | --- | --- |
| Thresholds | Int | Min and max thresholds, if applicable |
| Granularity or periodicity | Int | Values to be used is determining the granularity or periodicity with which the reporting should be provided |
| Validity time | Time | Indicates for how long the request is valid |

TABLE 35

| Element | Type | Description |
| --- | --- | --- |
| Application ID | Int | Application Identifier |
| Battery level | Int | Depending on the request type: Provides a numerical value quantifying the current battery level or the power consumption for the requesting application, relative to the total consumption. |

Figure 20:
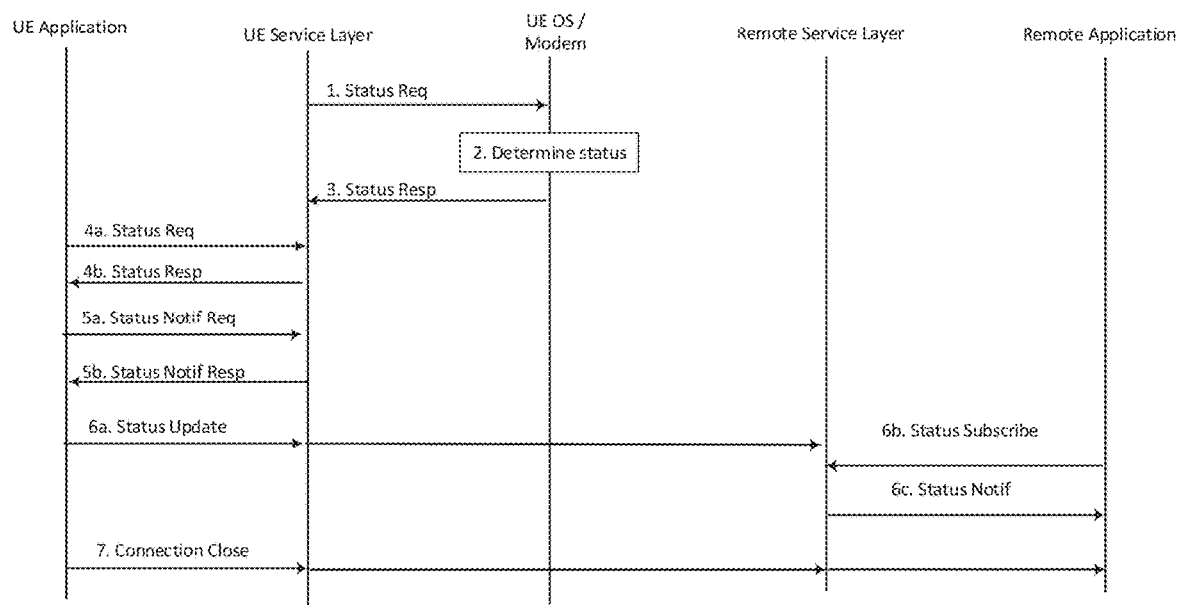
FIG. 20 illustrates a call flow for request status APIs according to an aspect of the application.

As shown in FIG. 20, a generic call flow illustrates how the Battery Status APIs might be used when substituted for the generic ones. The call flow will be discussed further below.

Memory Status

UE hosted applications may need to use the status of the memory use in their functionality, so they may provide a request to be informed such a status by the modem.

TABLE 36

| Element | Type | Description |
| --- | --- | --- |
| Application ID | Int | Application Identifier |
| Memory Status type | Text | The type of status request to be provided, e.g. periodic, threshold, continuous, one time. |
| Validity time | Time | Indicates for how long the request is valid |

TABLE 37

| Element | Type | Description |
| --- | --- | --- |
| Memory status | Int | Provides a numerical value quantifying the memory use level |

FIG. 20 illustrates a generic call flow showing of how the Memory Status APIs might be used when substituted for the generic ones. In Step 1, a UE Service Layer calls the Status Request API. The request may indicate that the Service Layer would like periodic updates or a one-time report of the current status (e.g. battery, memory). Alternatively, an UE Application could make this request directly to the UE Modem or OS.

Next in step 2, the UE OS or modem determines the request status. The UE OS or modem responds to the API call acknowledging that the request has been accepted (step 3). The response may include the current status. The UE Service Layer may update a data structure, or resource based on this status.

In step 4, an application may request a report of the status e.g. battery, memory, peripherals currently available at the service layer (step 4a). The UE service layer may respond with the latest received status (step 4b). Alternatively in step 5, the UE Application may subscribe to a data structure or resource related to the status report. For example, the UE application may request a notification when the battery level changes, goes across a threshold, etc. based on the information available in the SL resources. When the subscribed event occurs, the UE Service Layer sends a notification to the UE Application, in response to the subscription request in step 5b.

After steps 4 or 5, the UE Application may trigger other actions in response to the status report, as exemplified by the execution of either step 6 or step 7.

According to step 6, after the UE Application has been informed of the new status: (i) the UE application may update a remote resource, or data structure, based on the status report received. For example, it may update at a remote Service Layer its battery status before going to sleep; (ii) a remote Application may subscribe to the remote resource or data structure so that it will be notified when the status information available on the platform changes; and (iii) the remote Service Layer may send a notification to the remote application when the event subscribed to in step 7 occurs.

In step 7, the UE Application may close its connection with the UE Service Layer, Remote Service Layer, and/or Remote Application. This step may entail simply de-registering from the remote service layer and applications or it may also include updating data structures or resource before battery failure.

Peripheral Report

UE hosted applications may need to use the status of various peripherals attached to the communication module.

TABLE 38

| Element | Type | Description |
| --- | --- | --- |
| Application ID | Int | Application Identifier |
| Report type | Text | The type of status request to be provided, e.g. periodic, threshold, continuous, one time. |
| Peripheral | | Text The type of peripheral to provide the report for. |
| Validity time | | Time Indicates for how long the request is valid |

TABLE 39

| Element | Type | Description |
| --- | --- | --- |
| Application ID | Int | Application Identifier |
| Peripheral status | Int | Provides the status of the peripheral e.g. running, sleeping, off. |

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media does not include signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 6-20. The computer executable instructions may be stored in a memory and executed by a processor disclosed above in FIGS. 1C and 1D, and employed in devices including UEs in a mobile core network. In one embodiment, a computer-implemented UE having a non-transitory memory and processor operably coupled thereto, as described above in FIGS. 1C and 1D, is disclosed.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus communicating with a mobile core network comprising:
a non-transitory memory including instructions stored thereon for configuring a service; and
a processor operably coupled to the non-transitory memory configured to execute the instructions of:
receiving, from a node, first information for accessing an exposure function;
receiving a request for the service from an application;
creating a request for the service;
using the first information to send the created request to the exposure function;
receiving a response from the exposure function, the response includes a second information; and
sending the second information to the application,
wherein the service includes any one or more of buffering, a background data transfer, a communication pattern configuration, sponsored services, reachability, a mobile originating/paging-off mode or value added services,
wherein the received request includes a parameter to configure the service, and
wherein the second information includes any one or more of a desired time window, a desired data transfer size, a desired quality of service, an indication whether flow is sponsored, a maximum cost basis or qualitative measurements.

2. The apparatus of claim 1, wherein the processor is further configured to execute the instructions of confirming the application has requested and/or configured the service.

3. The apparatus of claim 1, wherein a RESTful application programming interface (API) is used to send the request to the exposure function.

4. The apparatus of claim 1, wherein the first information includes any one or more of an access point name (APN), a fully qualified domain name (FQDN), an Internet protocol (IP) address or a uniform resource indicator (URI).

5. The apparatus of claim 1, wherein the processor is further configured to execute an authentication procedure with the exposure function.

6. The apparatus of claim 1, wherein:
the second information includes a window start and a window length, and
the processor is further configured to execute the instructions of:
distributing an allowed background data transfer among one or more applications;
detecting an adjustment based upon a next window for data transfer; and
providing an indication before the window start.

7. The apparatus of claim 1, wherein the parameters includes any one or more of a desired start time, a desired end time or a duration.

8. The apparatus of claim 1, wherein the exposure function is a network exposure function.

9. A method for communicating with a mobile core network comprising:
receiving, from a core network node, first information for accessing an exposure function:
receiving a request for a service from an application;
creating a request for the service;
using the first information to send the created request to the exposure function;
receiving a response from the exposure function including second information; and
sending the second information to the application,
wherein the service includes any one or more of buffering, a background data transfer, a communication pattern configuration, sponsored services, reachability, a mobile originating/paging-off mode or value added services,
wherein the received request includes parameters to configure the service, and
wherein the second information includes any one or more of a desired time window, a desired data transfer size, a desire quality of service, an indication whether flow is sponsored, a maximum cost basis, qualitative measurements.

10. The method of claim 9, further comprising:
confirming the application has requested and/or configured the service.

11. The method of claim 9, wherein a RESTful API is used to send the request to the exposure function.

12. The method of claim 9, wherein the first information includes any one or more of an APN, a FQDN, an IP address or a URI.

13. The method of claim 9, further comprising:
executing an authentication procedure with the exposure function.

14. The method of claim 9, wherein the second information includes a window start and a window length.

15. The method of claim 14, further comprising:
distributing an allowed background data transfer among one or more applications;
detecting an adjustment based upon a next window for data transfer; and
providing an indication before the window start.

16. The method of claim 8, wherein the parameters includes any one or more of a desired start time, a desired end time or a duration.

17. The method of claim 9, wherein the exposure function is a network exposure function.

* * * * *